US010591592B2

(12) United States Patent
Mindell et al.

(10) Patent No.: US 10,591,592 B2
(45) Date of Patent: Mar. 17, 2020

(54) HIGH-PRECISION TIME OF FLIGHT MEASUREMENT SYSTEMS

(71) Applicant: Humatics Corporation, Waltham, MA (US)

(72) Inventors: David A. Mindell, Cambridge, MA (US); Gregory L. Charvat, Guilford, CT (US); Gary A. Cohen, Boston, MA (US); Dana R. Yoerger, Woods Hole, MA (US)

(73) Assignee: Humatics Corporation, Waltham, MA (US)

( * ) Notice: Subject to any disclaimer, the term of this patent is extended or adjusted under 35 U.S.C. 154(b) by 741 days.

(21) Appl. No.: 15/181,930

(22) Filed: Jun. 14, 2016

(65) Prior Publication Data

US 2016/0363659 A1     Dec. 15, 2016

Related U.S. Application Data

(60) Provisional application No. 62/306,478, filed on Mar. 10, 2016, provisional application No. 62/306,469, (Continued)

(51) Int. Cl.
*G01S 13/82* (2006.01)
*G01S 13/87* (2006.01)
(Continued)

(52) U.S. Cl.
CPC .............. *G01S 13/82* (2013.01); *G01S 5/021* (2013.01); *G01S 5/0247* (2013.01); *G01S 5/0294* (2013.01); *G01S 5/10* (2013.01); *G01S 5/14* (2013.01); *G01S 7/003* (2013.01); *G01S 7/352* (2013.01); *G01S 13/34* (2013.01); *G01S 13/66* (2013.01); *G01S 13/74* (2013.01); *G01S 13/878* (2013.01); *G01S 13/885* (2013.01); (Continued)

(58) Field of Classification Search
None
See application file for complete search history.

(56) References Cited

U.S. PATENT DOCUMENTS

| 2,851,681 A | 9/1958 | Cohn |
| 3,631,484 A | 12/1971 | Augenblick |

(Continued)

FOREIGN PATENT DOCUMENTS

| CN | 1094515 A | 11/1994 |
| CN | 102667521 A | 9/2012 |

(Continued)

OTHER PUBLICATIONS

International Search Report and Written Opinion for International Application No. PCT/US2016/037404 dated Sep. 16, 2016.
(Continued)

*Primary Examiner* — Whitney Moore

(57) ABSTRACT

A system and method is disclosed for measuring time of flight to an object. A transmitter transmits an electromagnetic signal and provides a reference signal corresponding to the electromagnetic signal. A receiver receives the electromagnetic signal and provides a response signal corresponding to the received electromagnetic signal. A detection circuit is configured to determine a time of flight between the transmitter and the receiver based upon the reference signal and the response signal.

41 Claims, 18 Drawing Sheets

Related U.S. Application Data filed on Mar. 10, 2016, provisional application No. 62/306,483, filed on Mar. 10, 2016, provisional application No. 62/275,400, filed on Jan. 6, 2016, provisional application No. 62/271,136, filed on Dec. 22, 2015, provisional application No. 62/268,727, filed on Dec. 17, 2015, provisional application No. 62/268,741, filed on Dec. 17, 2015, provisional application No. 62/268,734, filed on Dec. 17, 2015, provisional application No. 62/268,745, filed on Dec. 17, 2015, provisional application No. 62/268,736, filed on Dec. 17, 2015, provisional application No. 62/253,983, filed on Nov. 11, 2015, provisional application No. 62/243,264, filed on Oct. 19, 2015, provisional application No. 62/198,633, filed on Jul. 29, 2015, provisional application No. 62/175,819, filed on Jun. 15, 2015.

(51) Int. Cl.

| | |
|---|---|
| *G01S 5/10* | (2006.01) |
| *H04W 4/029* | (2018.01) |
| *G01S 5/02* | (2010.01) |
| *G01S 5/14* | (2006.01) |
| *G01S 7/00* | (2006.01) |
| *G01S 7/35* | (2006.01) |
| *G01S 13/34* | (2006.01) |
| *G01S 13/66* | (2006.01) |
| *G01S 13/74* | (2006.01) |
| *G01S 13/88* | (2006.01) |
| *G01S 13/89* | (2006.01) |
| *G01S 13/42* | (2006.01) |
| *G01S 13/76* | (2006.01) |

(52) U.S. Cl.
CPC ............. *G01S 13/89* (2013.01); *H04W 4/029* (2018.02); *G01S 13/42* (2013.01); *G01S 13/76* (2013.01); *G01S 2007/356* (2013.01); *G01S 2007/358* (2013.01)

(56) References Cited

U.S. PATENT DOCUMENTS

| | | |
|---|---|---|
| 3,781,879 A | 12/1973 | Staras |
| 4,001,822 A | 1/1977 | Sterzer |
| 4,217,549 A | 8/1980 | Henoch |
| 5,108,027 A | 4/1992 | Warner et al. |
| 5,111,202 A | 5/1992 | Rivera et al. |
| 5,115,245 A | 5/1992 | Wen et al. |
| 5,355,283 A | 10/1994 | Marrs et al. |
| 5,465,099 A | 11/1995 | Mitsui et al. |
| 5,495,255 A | 2/1996 | Komatsu et al. |
| 5,523,749 A | 6/1996 | Cole et al. |
| 6,046,683 A | 4/2000 | Pidwerbetsky |
| 6,084,530 A | 7/2000 | Pidwerbetsky et al. |
| 6,114,971 A | 9/2000 | Nysen |
| 6,192,222 B1 | 2/2001 | Greeff et al. |
| 6,297,773 B1 | 10/2001 | Fullerton et al. |
| 6,353,406 B1 | 3/2002 | Lanzl et al. |
| 6,356,764 B1 | 3/2002 | Ovard et al. |
| 6,369,710 B1 | 4/2002 | Poticny et al. |
| 6,480,143 B1 | 11/2002 | Kruger et al. |
| 6,600,443 B2 | 7/2003 | Landt |
| 6,633,226 B1 | 10/2003 | Nysen |
| 6,657,549 B1 | 12/2003 | Avery |
| 6,667,724 B2 | 12/2003 | Barnes et al. |
| 6,693,557 B2 | 2/2004 | Arnold et al. |
| 6,693,581 B2 | 2/2004 | Gottwald et al. |
| 6,812,824 B1 | 11/2004 | Goldinger et al. |
| 6,868,073 B1 | 3/2005 | Carrender |
| 6,914,579 B2 | 7/2005 | Schadler |
| 6,958,677 B1 | 10/2005 | Carter |
| 7,023,321 B2 | 4/2006 | Brillon et al. |
| 7,088,964 B2 | 8/2006 | O |
| 7,145,453 B2 | 12/2006 | Miller, Jr. et al. |
| 7,193,504 B2 | 3/2007 | Carrender et al. |
| 7,253,717 B2 | 8/2007 | Armstrong et al. |
| 7,253,719 B2 | 8/2007 | Diorio et al. |
| 7,259,676 B2 | 8/2007 | Knadle, Jr. et al. |
| 7,323,994 B2 | 1/2008 | Yamagajo et al. |
| 7,385,551 B2 | 6/2008 | Stephens |
| 7,388,464 B2 | 6/2008 | Ward et al. |
| 7,479,884 B1 | 1/2009 | Fullerton et al. |
| 7,504,992 B2 | 3/2009 | Pilcher, Jr. et al. |
| 7,526,266 B2 | 4/2009 | Al-Mahdawi |
| 7,567,206 B1 | 7/2009 | Schmidt et al. |
| 7,580,378 B2 | 8/2009 | Carrender et al. |
| 7,592,898 B1 | 9/2009 | Ovard et al. |
| 7,626,488 B2 | 12/2009 | Armstrong et al. |
| 7,649,491 B2 | 1/2010 | Ohara et al. |
| 7,801,491 B2 | 9/2010 | Hatakeyama et al. |
| 7,903,022 B2 | 3/2011 | Ohara et al. |
| 7,924,160 B1 | 4/2011 | Lapenta et al. |
| 7,965,191 B2 | 6/2011 | Rofougaran |
| 7,979,033 B2 | 7/2011 | Rofougaran |
| 8,060,400 B2 | 11/2011 | Wellman |
| 8,063,744 B2 | 11/2011 | Wu et al. |
| 8,081,117 B2 | 12/2011 | Nagai et al. |
| 8,264,226 B1 | 9/2012 | Olsson et al. |
| 8,279,112 B2 | 10/2012 | Carrick |
| 8,351,968 B2 | 1/2013 | Ovard et al. |
| 8,446,254 B2 | 5/2013 | Carrick et al. |
| 8,525,648 B1 | 9/2013 | Henty |
| 8,576,075 B2 | 11/2013 | Reynolds |
| 8,643,536 B2 | 2/2014 | Cavirani et al. |
| 8,723,720 B2 | 5/2014 | Moffatt et al. |
| 8,730,014 B2 | 5/2014 | Fullerton |
| 8,855,169 B2 | 10/2014 | Ovard et al. |
| 9,041,514 B2 | 5/2015 | Nogami |
| 9,141,836 B2 | 9/2015 | Domokos et al. |
| 9,413,418 B2 | 8/2016 | Bottazzi et al. |
| 9,485,037 B1 | 11/2016 | Weller et al. |
| 9,489,813 B1 | 11/2016 | Beigel |
| 9,562,396 B2 | 2/2017 | Baym et al. |
| 9,755,317 B2 | 9/2017 | Grelier et al. |
| 9,768,837 B2 | 9/2017 | Charvat et al. |
| 9,797,988 B2 | 10/2017 | Charvat et al. |
| 9,903,939 B2 | 2/2018 | Charvat et al. |
| 9,915,725 B1 | 3/2018 | Charvat et al. |
| 10,094,909 B2 | 10/2018 | Charvat et al. |
| 10,168,419 B2 | 1/2019 | Trummer |
| 10,205,218 B2 | 2/2019 | Charvat et al. |
| 2002/0071435 A1 | 6/2002 | Bolgiano et al. |
| 2003/0020173 A1 | 1/2003 | Huff et al. |
| 2004/0257267 A1 | 12/2004 | Mafune et al. |
| 2005/0012653 A1 | 1/2005 | Heide et al. |
| 2005/0156806 A1 | 7/2005 | Ohta et al. |
| 2005/0207481 A1 | 9/2005 | Forstner |
| 2005/0237953 A1 | 10/2005 | Carrender et al. |
| 2006/0250935 A1 | 11/2006 | Hamamoto et al. |
| 2007/0013599 A1 | 1/2007 | Gaucher et al. |
| 2007/0164420 A1 | 7/2007 | Chen et al. |
| 2007/0182949 A1 | 8/2007 | Niclass |
| 2007/0237029 A1 | 10/2007 | Watson |
| 2008/0088503 A1 | 4/2008 | Beasley |
| 2008/0158081 A1 | 7/2008 | Rofougaran |
| 2008/0158084 A1 | 7/2008 | Rofougaran |
| 2008/0198065 A1 | 8/2008 | Voigtlander et al. |
| 2008/0204238 A1 | 8/2008 | White |
| 2008/0205495 A1 | 8/2008 | Trott |
| 2008/0224874 A1 | 9/2008 | Rodgers |
| 2008/0231420 A1 | 9/2008 | Koyama et al. |
| 2008/0311862 A1 | 12/2008 | Spina et al. |
| 2009/0073054 A1 | 3/2009 | Yoon et al. |
| 2009/0201152 A1 | 8/2009 | Karr et al. |
| 2009/0315777 A1 | 12/2009 | Baughman |
| 2009/0322491 A1 | 12/2009 | Wood, Jr. |
| 2010/0039247 A1 | 2/2010 | Ziegler et al. |
| 2010/0073188 A1 | 3/2010 | Mickle et al. |
| 2010/0117823 A1 | 5/2010 | Wholtjen |

(56) References Cited

U.S. PATENT DOCUMENTS

| | | |
|---|---|---|
| 2010/0302117 A1 | 12/2010 | Johnson |
| 2010/0328073 A1 | 12/2010 | Nikitin et al. |
| 2011/0007758 A1 | 1/2011 | Macrae |
| 2011/0163882 A1 | 7/2011 | August et al. |
| 2011/0181892 A1 | 7/2011 | Ritter et al. |
| 2011/0187507 A1 | 8/2011 | Nikitin et al. |
| 2011/0285606 A1 | 11/2011 | De Graauw et al. |
| 2012/0105300 A1 | 5/2012 | Ando et al. |
| 2012/0116665 A1 | 5/2012 | Aoki et al. |
| 2012/0146834 A1 | 6/2012 | Karr |
| 2012/0158235 A1 | 6/2012 | Jaynes |
| 2012/0182129 A1 | 7/2012 | Eggers et al. |
| 2013/0016023 A1 | 1/2013 | Gaucher et al. |
| 2013/0023210 A1 | 1/2013 | Roufougaran |
| 2013/0150160 A1 | 6/2013 | El Dokor et al. |
| 2013/0162491 A1 | 6/2013 | Yu |
| 2013/0307742 A1 | 11/2013 | Hu et al. |
| 2013/0321095 A1 | 12/2013 | Lam et al. |
| 2013/0342321 A1 | 12/2013 | Zogg et al. |
| 2014/0096871 A1 | 4/2014 | Kaye |
| 2014/0135042 A1 | 5/2014 | Buchheim et al. |
| 2014/0138109 A1 | 5/2014 | Duncan et al. |
| 2014/0253296 A1 | 9/2014 | Arthaber |
| 2014/0347222 A1 | 11/2014 | Ling |
| 2014/0349675 A1 | 11/2014 | Schatzberg et al. |
| 2014/0359540 A1 | 12/2014 | Kelsey et al. |
| 2015/0019391 A1 | 1/2015 | Kumar et al. |
| 2015/0048907 A1 | 2/2015 | Almgren et al. |
| 2015/0282115 A1 | 10/2015 | Pitt et al. |
| 2016/0190696 A1 | 6/2016 | Preradovic et al. |
| 2016/0311388 A1 | 10/2016 | Diewald |
| 2016/0358440 A1 | 12/2016 | Trivelpiece et al. |
| 2016/0363648 A1 | 12/2016 | Mindell et al. |
| 2016/0363663 A1 | 12/2016 | Mindell et al. |
| 2016/0363664 A1 | 12/2016 | Mindell et al. |
| 2016/0370456 A1 | 12/2016 | Emanuelsson |
| 2017/0098888 A1 | 4/2017 | Geary et al. |
| 2017/0176572 A1 | 6/2017 | Charvat et al. |
| 2017/0179570 A1 | 6/2017 | Charvat et al. |
| 2017/0179571 A1 | 6/2017 | Charvat et al. |
| 2017/0179602 A1 | 6/2017 | Charvat et al. |
| 2017/0179603 A1 | 6/2017 | Charvat et al. |
| 2017/0180011 A1 | 6/2017 | Charvat et al. |
| 2017/0181118 A1 | 6/2017 | Charvat et al. |
| 2017/0201005 A1 | 7/2017 | Charvat et al. |
| 2017/0328980 A1 | 11/2017 | Charvat et al. |
| 2017/0363709 A1 | 12/2017 | Charvat et al. |
| 2017/0371026 A1 | 12/2017 | Charvat et al. |
| 2018/0067190 A1 | 3/2018 | Charvat et al. |
| 2018/0231651 A1 | 8/2018 | Charvat |
| 2018/0239010 A1 | 8/2018 | Mindell et al. |
| 2018/0375190 A1 | 12/2018 | Charvat et al. |
| 2019/0173157 A1 | 6/2019 | Charvat et al. |

FOREIGN PATENT DOCUMENTS

| | | |
|---|---|---|
| CN | 104422927 A | 3/2015 |
| EP | 1939980 A1 | 7/2008 |
| GB | 2260065 A | 3/1993 |
| WO | WO 2016/205216 A1 | 12/2016 |
| WO | WO 2016/205217 A1 | 12/2016 |
| WO | WO 2016/205218 A1 | 12/2016 |
| WO | WO 2016/205219 A1 | 12/2016 |

OTHER PUBLICATIONS

Invitation to Pay Additional Fees for International Application No. PCT/US2016/037406 dated Aug. 5, 2016.
International Search Report and Written Opinion for International Application No. PCT/US2016/037406 dated Oct. 26, 2016.
International Search Report and Written Opinion for International Application No. PCT/US2016/037403 dated Sep. 1, 2016.
International Search Report and Written Opinion for International Application No. PCT/US2016/037407 dated Sep. 2, 2016.
[No Author Listed] Adafruit NeoPixel Digital RGB LED Strip—White 30 LED—White. 7 Pages. https://www.adafruit.com/products/1376 Last accessed Jan. 3, 2017.
Chalvatzis, An Injection-Locked 8.5 GHz VCO with Decade-Wide Programmable Locking Range in SiGe BiCMOS. IEEE. 2015;101-4.
Charvat et al., Harmonic Radar Tag Measurement and Characterization. IEEE. 2003;696-9.
Charvat et al., Time-of-Flight Microwave Camera. Sci. Rep. 5:14709; doi:10.1038/srep14709. 2015;1-6.
Charvat, Police Doppler Radar and Motion Sensors. In: Small and Short Range Radar Systems. 2014. Charvat, Chapter 8:20 pages.
Charvat, Continuous Wave (CW) Radar. In: Small and Short Range Radar Systems. 2014. Charvat, Chapter 2:34 pages.
Charvat, Frequency Modulated Continuous Wave (FMCW) Radar. In: Small and Short Range Radar Systems. 2014. Charvat, Chapter 3:71 pages.
Cho et al., A frequency agile floating-patch MEMS antenna for 42 GHz applications. 0-7803-883-6/05. IEEE. 2005;512-5.
Follmann et al., A Low-Noise 8-12 GHz Fractional-N PLL in SiGe BiCMOS Technology. Proceedings of the 5th European Microwave Integrated Circuits Conference. EuMA. 2010;98-101.
Ravinuthula et al., A Low Power High Performance PLL with Temperature Compensated VCO in 65nm CMOS. 2016 IEEE Radio Frequency Integrated Circuits Symposium. IEEE. 2016;31-34.
Saiz et al., A 135GHz SiGe Transmitter With a Dielectric Rod Antenna-In-Package for High EIRP/Channel Arrays. Proceedings of the IEEE 2014 Custom Integrated Circuits Conference, Sep. 15-17, 2014;1-4.
Tang et al., 183GHz 13.5mW/Pixel CMOS Regenerative Receiver for mm-Wave Imaging applications. ISSCC 2011/Session 16/mm-Wave Design Techniques/ 16.10. IEEE International Solid-State Circuits Conference. 2011;296-8.
Yan et al., A 8.3-11.3GHz low cost Integer-N synthesizer with 1.1° RMS phase error in 65nm CMOS. IEEE. 2012;225-7.
International Search Report and Written Opinion for International Application No. PCT/US16/67265 dated Apr. 14, 2017.
Extended European Search Report for European Application No. 16812242.2 dated Feb. 11, 2019.
Extended European Search Report for European Application No. 16876808.3 dated Aug. 5, 2019.

HIGH-PRECISION TIME OF FLIGHT MEASUREMENT SYSTEMS

CROSS-REFERENCE TO RELATED APPLICATIONS

This application claims priority under 35 U.S.C. § 119 to U.S. provisional application Ser. Nos. 62/175,819 filed Jun. 15, 2015; 62/198,633 filed Jul. 29, 2015; 62/243,264 filed Oct. 19, 2015; 62/253,983 filed Nov. 11, 2015; 62/268,727, 62/268,734, 62/268,736, 62/268,741, and 62/268,745, each filed Dec. 17, 2015; 62/271,136 filed Dec. 22, 2015; 62/275,400 filed Jan. 6, 2016; and 62/306,469, 62/306,478, and 62/306,483, each filed Mar. 10, 2016, each of which is herein incorporated by reference in its entirety for all purposes.

BACKGROUND

1. Field of the Disclosure

The present disclosure generally relates to distance measurements, and more particularly to measuring distances using electromagnetic signals.

2. Discussion of Related Art

Tracking and ranging of an object typically relies on reflected signals from the object, as in radar tracking and ranging, and yields only bulk information about the relative position and movements of the object. Orientation of the object is difficult to perceive with such systems, and visual or imaging systems yield only slightly better results because they tend to be limited to two dimensional images of the object which may mislead a system or observer as to the actual orientation of the object. There exists a need for a system able to yield precise information about the range (distance) to an object, which allows precise sensing of changes, precise tracking of motion, and, when implemented to locate various parts of the object, may precisely determine orientation of the object.

SUMMARY

Aspects and embodiments relate to measuring time of flight and, in particular, measuring time of flight by electromagnetic signals.

In one aspect, a system for measuring time of flight to an object includes at least one transmitter configured to transmit an electromagnetic signal and provide a reference signal corresponding to the electromagnetic signal, at least one receiver configured to receive the electromagnetic signal and in response provide a response signal corresponding to the received electromagnetic signal, and a detection circuit configured to determine a time of flight between the transmitter and the receiver based upon the reference signal and the response signal.

In some embodiments the detection circuit is further configured to determine a distance between the transmitter and the receiver based at least in part upon the time of flight. In some embodiments the electromagnetic signal is a frequency modulated continuous wave (FMCW) signal, a direct sequence spread spectrum signal (DSSS), a pulse compressed signal, or a frequency hopping spread spectrum (FHSS) signal. In some embodiments the detection circuit includes a mixer that receives the reference signal and the response signal, and provides a beat signal corresponding to the time of flight between the transmitter and the receiver. In some embodiments the detection circuit also includes an analog to digital converter that receives the beat signal and provides a sampled beat signal, and includes a processor coupled to an output of the analog to digital converter that receives the sampled beat signal and performs a fast Fourier transform on the sampled beat signal.

In some embodiments the system includes a cable coupled between the detection circuit and at least one of the transmitter and the receiver, the cable configured to convey to the detection circuit at least one of the reference signal and the response signal. In some embodiments the detection circuit is configured to wirelessly receive at least one of the reference signal and the response signal.

In some embodiments the transmitter includes a pseudo noise generator.

In some embodiments the transmitter is configured to transmit and the receiver is configured to receive the electromagnetic signal having one of a command protocol and an embedded unique code in the electromagnetic signal to address and enable each receiver.

In some embodiments the receiver includes an auxiliary wireless receiver configured to receive an auxiliary wireless signal configured with a unique code to target the receiver, and the receiver is configured to power up the receiver to provide the response signal when the receiver has received the auxiliary wireless signal and not to provide the response signal when the receiver has not received the auxiliary wireless signal. In some embodiments the auxiliary wireless receiver is configured to receive the auxiliary wireless signal as a Bluetooth signal, a Zigbee signal, a Wi-Fi signal, or a cellular signal.

In some embodiments the receiver includes at least one antenna configured to receive the electromagnetic signal at a first frequency, and a multiplier coupled to the at least one antenna to receive the electromagnetic signal at the first frequency and that provides a multiplied signal having a harmonic component at a second frequency that is a harmonic multiple of the first frequency. In some embodiments the receiver includes a power source that is configured to normally bias the multiplier to a biased off state and that is configured to bias on the multiplier to an on state in response to receipt of the auxiliary wireless signal configured with the unique code to target the receiver. In some embodiments the power source is further configured to forward bias the multiplier to increase a sensitivity and range of the receiver. In some embodiments the receiver has no active components other than the multiplier, which is configured to normally be off so as to require substantially no power. In some embodiments the power source is one of a low power battery source or power is derived by one or more energy harvesting techniques. In some embodiments the antenna comprises a single antenna for both receiving the electromagnetic signal at the first frequency and transmitting the multiplied signal at the second frequency. In some embodiments the receiver includes the multiplier integrated with the antenna element.

In some embodiments the transmitter includes a plurality of receive channels configured to receive the electromagnetic signal at the second frequency in a spatially diverse array. In some embodiments the plurality of receive channels can either be multiplexed to receive the electromagnetic signal at the second frequency at different times or can be configured to operate simultaneously.

In some embodiments the transmitter is configured to provide a modulated electromagnetic signal and the receiver is configured to receive the modulated electromagnetic signal to uniquely address the receiver.

In some embodiments the transmitter and the receiver are configured to operate simultaneously.

In some embodiments the transmitter comprises in phase and 90° out of phase (quadrature) channels with multipliers that are modulated in quadrature to send coded electromagnetic signals to a plurality of receivers simultaneously.

In some embodiments the at least one receiver includes a plurality of receivers and the at least one transmitter and the plurality of receivers are configured to time share and uniquely address each receiver of the plurality of receivers.

In some embodiments the at least one receiver includes a plurality of receivers and the at least one transmitter and the plurality of receivers are configured to dynamically assess and address the plurality of receivers that are moving faster than others more frequently.

In some embodiments the at least one receiver includes a plurality of receivers and the at least one transmitter and the plurality of receivers are configured with their own proprietary micro-location frequency allocation protocol so that the receiver and at least one transmitter can operate at unused frequency bands that exist amongst existing allocated frequency bands. In some embodiments the at least one transmitter and the plurality of receivers are configured to license-free bands. In some embodiments the at least one transmitter and the plurality of receivers are configured to communicate with existing systems at existing licensed frequencies to use existing frequency allocations in situations that warrant using existing frequency band allocations. In some embodiments the at least one transmitter and the plurality of receivers are configured to detect loading issues within any used frequency band and to allocate signals to be used based on system usage.

In some embodiments the system includes a plurality of transmitters configured to transmit a plurality of electromagnetic signals, and the detection circuit is configured to determine one or more distances between the receiver and one or more of the transmitters.

In some embodiments the detection circuit is further configured to determine a position of the receiver at least in part from one or more of the one or more distances.

In some embodiments the system includes a plurality of transmitters configured to transmit a plurality of electromagnetic signals, and the detection circuit is configured to determine one or more time differences of arrival between two or more of the plurality of electromagnetic signals. In some embodiments the detection circuit is further configured to determine a position of the receiver at least in part from one or more of the one or more time differences of arrival.

In another aspect, a method of measuring time of flight to an object includes receiving a reference signal from an interrogator, the reference signal corresponding to an electromagnetic signal transmitted by the interrogator, receiving a response signal from a transponder, the response signal provided by the transponder in response to receiving the electromagnetic signal, and the response signal corresponding to the received electromagnetic signal, and determining a time of flight of the electromagnetic signal between the interrogator and the transponder based upon the reference signal and the response signal.

In some embodiments the method includes determining the distance between the interrogator and the transponder based at least in part upon the time of flight.

In some embodiments the electromagnetic signal is a frequency modulated continuous wave (FMCW) signal, a direct sequence spread spectrum (DSSS) signal, a pulse compressed signal, or a frequency hopping spread spectrum (FHSS) signal.

In some embodiments determining the time of flight includes mixing the response signal and the reference signal to provide a beat signal corresponding to the time of flight. In some embodiments the method includes converting the beat signal into a digital form to provide a sampled beat signal and performing a fast Fourier transform on the sampled beat signal.

In some embodiments at least one of the reference signal and the response signal are received via a cable. In some embodiments at least one of the reference signal and the response signal are received wirelessly.

In some embodiments the electromagnetic signal is generated, at least in part, from a pseudo noise generator.

In some embodiments the response signal is received from the transponder only when the transponder has received an auxiliary signal, and the response signal is not received from the transponder when the transponder has not received the auxiliary signal. In some embodiments the auxiliary signal is a Bluetooth signal, a Zigbee signal, a Wi-Fi signal, a cellular signal, or a unique code.

In some embodiments the method includes receiving a plurality of response signals from the transponder, each of the plurality of response signals provided in response to receiving one of a plurality of electromagnetic signals from a plurality of interrogators, and determining one or more distances between the transponder and one or more of the plurality of interrogators. In some embodiments the method includes determining a position of the transponder at least in part from one or more of the one or more distances.

In some embodiments the method includes receiving a plurality of response signals from the transponder, each of the plurality of response signals provided in response to receiving one of a plurality of electromagnetic signals from a plurality of interrogators, and determining one or more time differences of arrival between two or more of the plurality of electromagnetic signals. In some embodiments the method includes determining a position of the transponder at least in part from one or more of the one or more time differences of arrival.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least on embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure.

In the Figures.

DETAILED DESCRIPTION

Figure 1:
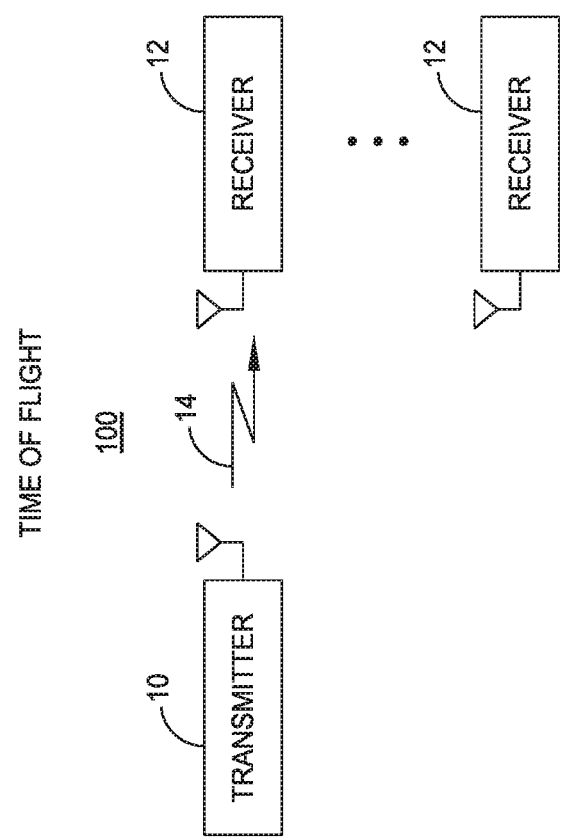
FIG. 1 illustrates one embodiment of a system for measuring distance with precision based on a bi-static ranging system configuration for measuring a direct time-of-flight (TOF)

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Definitions:

A transceiver is a device comprising both a transmitter (an electronic device that, with the aid of an antenna, produces electromagnetic signals) and a receiver (an electronic device that, with the aid of an antenna, receives electromagnetic signals and converts the information carried by them to a usable form) that share common circuitry.

A transmitter-receiver is a device comprising both a transmitter and a receiver that are combined but do not share common circuitry.

A transmitter is a transmit-only device, but may refer to transmit components of a transmitter-receiver, a transceiver, or a transponder.

A receiver is a receive-only device, but may refer to receive components of a transmitter-receiver, a transceiver, or a transponder.

A transponder is a device that emits a signal in response to receiving an interrogating signal identifying the transponder and received from a transmitter.

Radar (for Radio Detection and Ranging) is an object-detection system that uses electromagnetic signals to determine the range, altitude, direction, or speed of objects. For purposes of this disclosure, "radar" refers to primary or "classical" radar, where a transmitter emits radiofrequency signals in a predetermined direction or directions, and a receiver listens for signals, or echoes, that are reflected back from an object.

Radio frequency signal or "RF signal" refers to electromagnetic signals in the RF signal spectrum that can be CW or pulsed or any form.

Pulse Compression or pulse compressed signal refers to any coded, arbitrary, or otherwise time-varying waveform to be used for Time-of-Flight (TOF) measurements, including but not limited to FMCW, Linear FM, pulsed CW, Impulse, Barker codes, and any other coded waveform.

Wired refers to a network of transmitters, transceivers, receivers, transponders, or any combination thereof, that are connected by a physical waveguide such as a cable to a central processor.

Wireless refers to a network of transmitters, transceivers, receivers, transponders, or any combination thereof that are connected only by electromagnetic signals transmitted and received wirelessly, not by physical waveguide.

Calibrating the network refers to measuring distances between a transmitters, transceivers, receivers, transponders, or any combination thereof.

High precision ranging refers to the use electromagnetic signals to measure distances with millimeter or sub-millimeter precision.

One-way travel time or TOF refers to the time it takes an electromagnetic signal to travel from a transmitter or transceiver to a receiver or transponder.

Two-way travel time or TOF refers to the time it takes an electromagnetic signal to travel from a transmitter or transceiver to a transponder plus the time it takes for the signal, or response, to return to the transceiver or a receiver.

Referring to FIG. 1, aspects and embodiments of one embodiment of a system for measuring distance with precision of the present invention are based on a bi-static ranging system configuration, which measures a direct time of flight (TOF) of a transmitted signal between at least one transmitter 10 and at least one receiver 12. This embodiment of a ranging system of the invention can be characterized as an apparatus for measuring TOF of an electromagnetic signal 14. This embodiment of an apparatus is comprised of at least one transmitter 10, which transmits an electromagnetic signal 14 to at least one receiver 12, which receives the transmitted signal 14 and determines a time of flight of the received signal. A time of flight of the electromagnetic signal 14 between the transmission time of the signal 14 transmitted from the transmitter 10 to the time the signal is received by the receiver 12 is measured to determine the TOF of the signal 14 between the transmitter and the receiver. A signal processor within one of the transmitter 10 and the receiver 12 analyzes the received and sampled signal to determine the TOF. The TOF of the signal 14 is indicative of the distance between the transmitter 10 and the receiver 12, and can be used for many purposes, some examples of which are described herein.

A preferred embodiment of the ranging system of the present invention is illustrated and described with reference to FIG. 2. In particular, one embodiment of a ranging system according to the present invention includes a transmitter 10 which can, for example, be mounted on an object for which a position and/or range is to be sensed. The transmitter 10 transmits a frequency modulated continuous wave (FMCW) signal 14'. At least one receiver 12 is coupled to the transmitter 10 by a cable 16. The cable 16 returns the received transmitted signal received by the at least one receiver back to the transmitter 10. In the transmitter 10, the transmitted signal 14' is split by a splitter 17 prior to being fed to and transmitted by an antenna 18. A portion of the transmitted signal 14' that has been split by the splitter 16 is fed to a first port of a mixer 20 and is used as local oscillator (LO) signal input signal for the mixer. The transmitted signal 14' is received by an antenna 22 at the receiver 12 and is output by the at least one receiver 12 to a combiner 24, which combines the received signals from the at least one receiver 12 and forwards the combined received signals with the cable 16 to a second port of the mixer 20. An output signal 21 from the mixer has a beat frequency that corresponds to a time difference between the transmitted signal from the transmitter 10 to the received signal by the receiver 12. Thus, the beat frequency of the output signal 21 of the mixer is representative of the distance between the transmitter and the receiver. The output signal 21 of the mixer 20 is supplied to an input of an Analog to Digital converter 26 to provide a sampled output signal 29. The sampled signal 29 can be provided to a processor 28 configured to determine the beat frequency to indicate a TOF, which is indicative of the distance between the transmitter and receiver.

This embodiment of the ranging system is based on the transmission and reception of an FMCW transmitted signal and determining a beat frequency difference between the transmitted and received signals. The beat frequency signal is proportional to the TOF distance between the transmitter and the receiver. By way of example, the sampled signal from the A/D converter 26 is fed to the Fast Fourier Transform (FFT) device 30 to transform the sampled time signal into the frequency domain x(t) $\Rightarrow$ X(k). It will be understood that other transforms or algorithms may be used, such as multiple signal classifiers (MUSIC), estimation of signal parameters via rotational invariance techniques (ESPRIT), discrete Fourier transforms (DFT), and inverse Fourier transforms (IFT), for example. From the FFT, the TOF of the signal 14' can be determined. In particular, the data output from the A/D converter 26 is a filtered set of amplitudes, with some low frequency noise. According to aspects of this embodiment a minimum amplitude threshold for object detection to occur can be set so that detection is triggered by an amplitude above the minimum threshold. If an amplitude of the sampled signal at a given frequency does not reach the threshold, it may be ignored.

Figure 2:
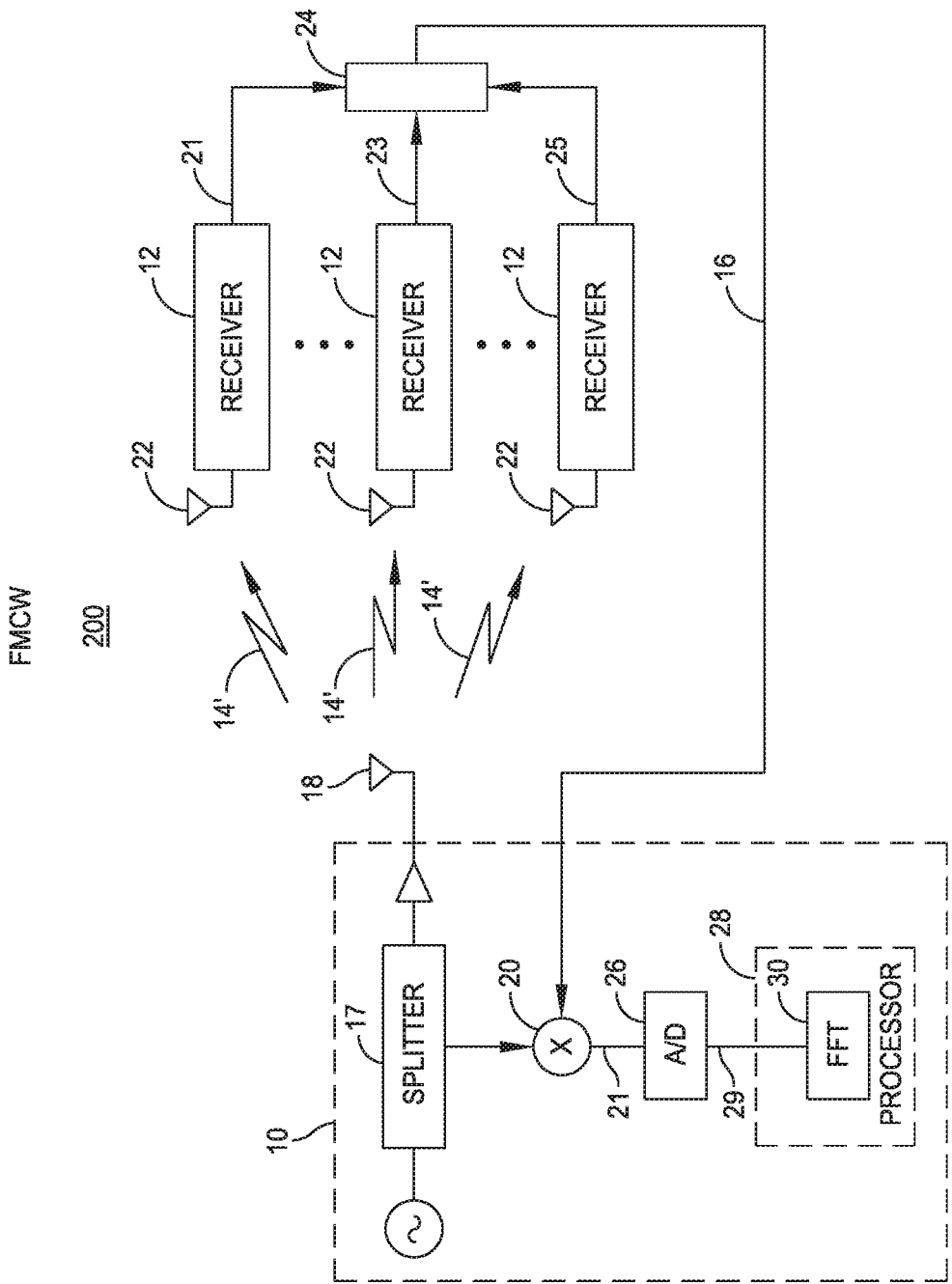
FIG. 2 illustrates one embodiment of a system for measuring distance with precision based on frequency modulated continuous wave (FMCW) TOF signals.

In the system illustrated in FIG. 2, any number of additional receivers 12 can be included in the system. The output signals from the additional receivers 12 are selected by a switch 24 and fed back to the transmitter 10 by the cable 16 to provide selected received signals at the additional receivers for additional time of flight measured signals at additional receivers 12. In an alternate embodiment, the mixer 20 and the A/D converter 26 can be included in each receiver to output a digital signal from each receiver. In this embodiment, the digital signal can be selected and fed back to the transmitter for further processing. It is appreciated that for this embodiment, the FFT processing can be done either in each receiver or at the transmitter. The TOF measured signals resulting from the additional receivers 12 can be processed to indicate the position of the object to which the transmitter 10 is mounted with a number of degrees of freedom and with excellent resolution according to the present invention. Also as is illustrated with reference to FIG. 8, according to aspects and embodiments of this disclosure, it is appreciated that multiple transmitters can be coupled to multiple receivers to produce a sophisticated position-detecting system.

In the ranging system of FIG. 2, at least one transmitter 10 can be mounted on an object to be tracked in distance and position. The receivers each generate a signal for determining a TOF measurement for the signal 14' transmitted by the transmitter. The receivers 12 are coupled to the processor 28 to produce data indicating the TOF from the transmitter to each of the three receivers, which can be used for precise position detection of the transmitter 10 coupled to the object. It is appreciated that various arrangements of transmitters and receivers may be used to triangulate the position of the object to which the transmitter is attached, providing information such as x, y, z position as well as translation and 3 axes of rotation of the transmitter 10.

It is appreciated that for any of the embodiments and aspects disclosed herein, there can be coordinated timing between the transmitter and receivers to achieve the precise distance measurements. It is also appreciated that the disclosed embodiments of the system are capable of measuring distance by TOF on the order of about a millimeter or sub-millimeter scale in precision, at 1 Hz or less in frequency over a total range of hundreds of meters. It is anticipated that embodiments of the system can be implemented with very low-cost components for less $100.

Modulation Ranging Systems.

Figure 3:
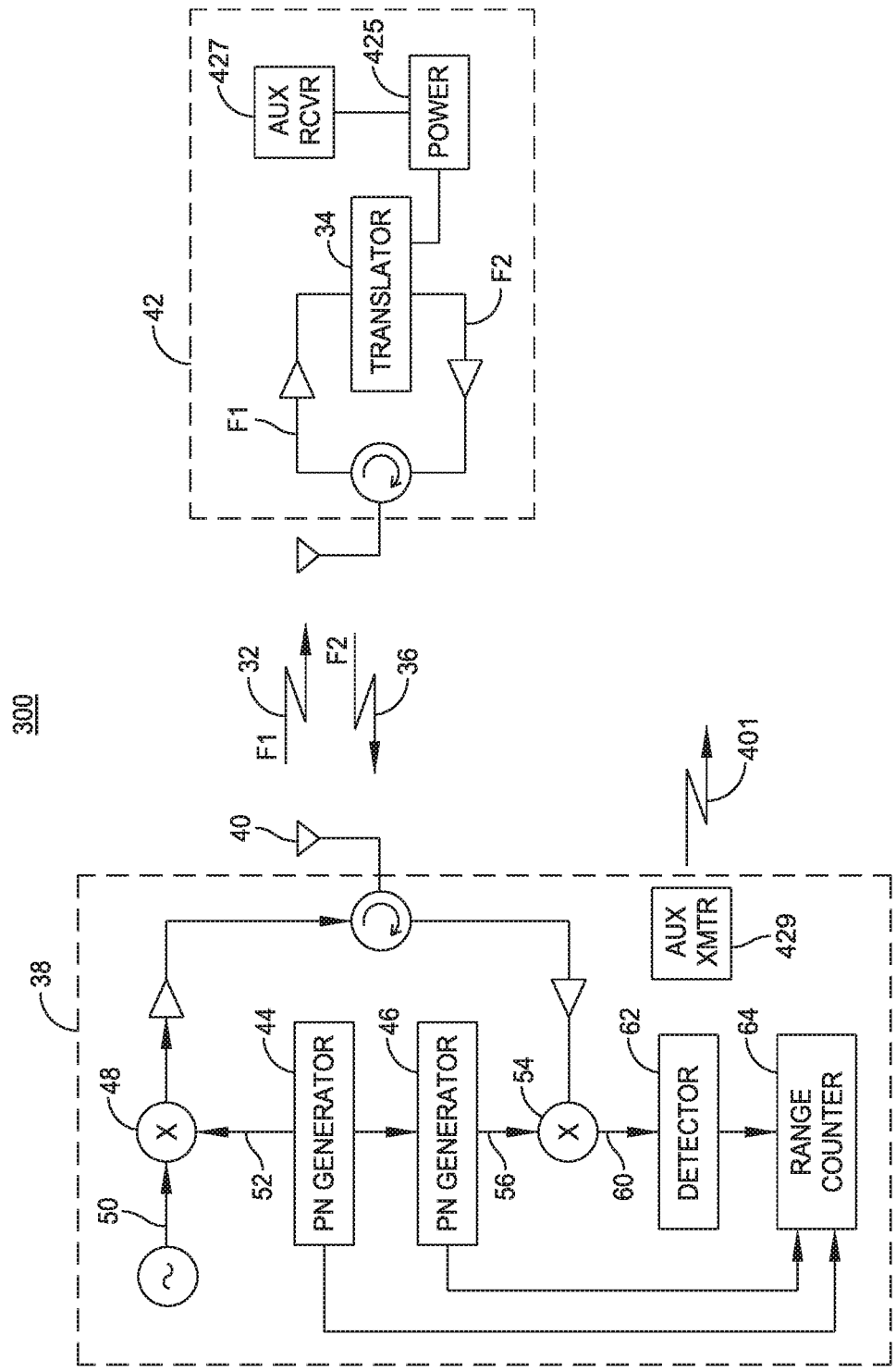
FIG. 3 illustrates one embodiment of a system for measuring distance with precision based on direct sequence spread spectrum (DSSS) TOF signals.

Referring to FIG. 3, there is illustrated another embodiment of a ranging system 300 implemented according to the present invention. It is appreciated that various form of modulation such as harmonic modulation, Doppler modulation, amplitude modulation, phase modulation, frequency modulation, signal encoding, and combinations thereof can be used to provide precision navigation and localization. One such example is illustrated in FIG. 3, which illustrates a use of pulsed direct sequence spread spectrum (DSSS) signals 32 to determine range or distance. In direct sequence spread spectrum ranging systems, code modulation of the transmitted signal 32 and demodulation of a received and re-transmitted signal 36 can be done by phase shift modulating a carrier signal. A transmitter portion of a transceiver 38 transmits via an antenna 40 a pseudo-noise code-modulated signal 32 having a frequency F1. It is to be appreciated that in a duplex ranging system, the transceiver 38 and a transponder 42 can operate simultaneously.

As shown in FIG. 3, the transponder 42 receives the transmitted signal 32 having frequency F1, which is fed to and translated by a translator 34 to a different frequency F2, which can be for example 2×F1 and is retransmitted by the transponder 42 as code-modulated signal 36 having frequency F2. A receiver subsystem of the transceiver 38, which is co-located with the transmitter portion of the transceiver 38 receives the retransmitted signal 36 and synchronizes to the return signal. In particular, by measuring the time delay between the transmitted signal 32 being transmitted and received signal 36, the system can determine the range from itself to the transponder. In this embodiment, the time delay corresponds to the two-way propagation delay of the transmitted 32 and retransmitted signals 36.

According to aspects of this embodiment, the system can include two separate PN code generators 44, 46 for the transmitter and receiver subsystems of the transceiver 38, so that the code at the receiver portion of the transceiver can be out of phase with the transmitted code or so that the codes can be different.

The transmitter portion of the transceiver 38 for measuring TOF distance of an electromagnetic signal comprises a 1st pseudo noise generator 44 for generating a first phase shift signal, a first mixer 48 which receives a carrier signal 50, which modulates the carrier signal with a first phase shift signal 52 to provide a pseudo-noise code-modulated signal 32 having a center frequency F1 that is transmitted by the transceiver 38. The transponder apparatus 42 comprises the translator 34 which receives the pseudo-noise code-modulated signal 32 having center frequency F1 and translates the pseudo-noise code-modulated signal of frequency F1 to provide a translated pseudo-noise code-modulated signal having a center frequency F2 or that provides a different coded signal centered at the center frequency F1, and that is transmitted by the transponder back to the transceiver 38. The transceiver apparatus 38 further comprises a second pseudo noise generator 46 for generating a second phase shift signal 56, and a second mixer 54 which receives the second phase shift signal 56 from the pseudo-noise generator 46, which receives the translated pseudo-noise code-modulated signal 36 at frequency F2 and modulates the pseudo-correlated code-modulated signal 36 having center frequency F2 with the second phase shift signal 56 to provide a return signal 60. The apparatus further comprises a detector 62 which detects the return signal 60, and a ranging device/counter 64 that measures the time delay between the transmitted signal 32 and the received signal 36 to determine the round trip range from the transceiver 38 to the transponder 42 and back to the transceiver 38 so as to determine the two-way propagation delay. According to aspects of some embodiments, the first PN generator 44 and the second PN generator 46 can be two separate PN code generators.

It is appreciated that the preciseness of this embodiment of the system depends on the signal-to-noise ratio (SNR) of the signal, the bandwidth, and the sampling rate of the sampled signals. It is also appreciated that this embodiment of the system can use any pulse compressed signal.

Figure 9:
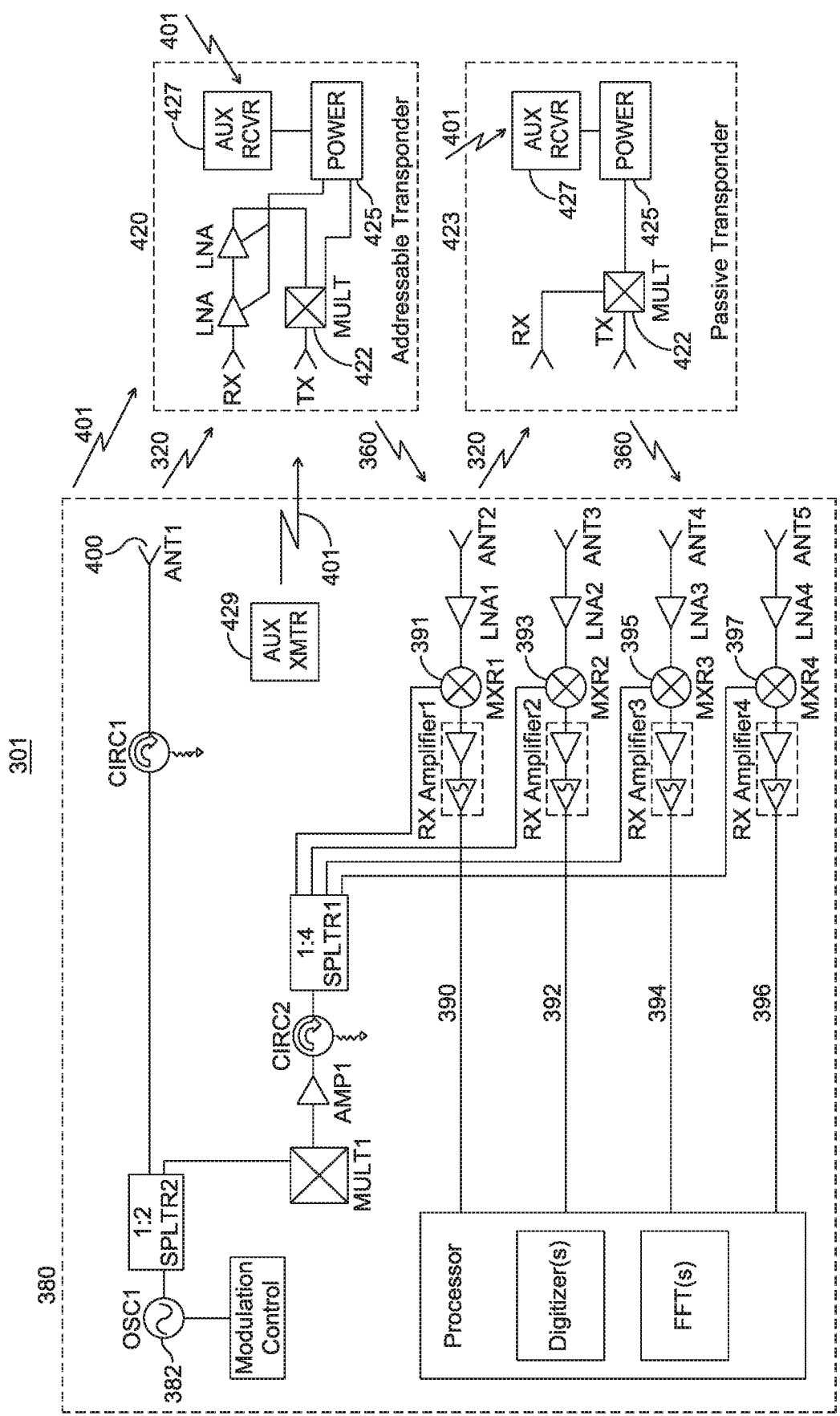
FIG. 9 illustrates one embodiment of a system for measuring location with precision with modulated TOF signals.

FIG. 9 illustrates another embodiment of a modulation ranging system 301. This embodiment can be used to provide a transmitted signal at frequency F1 from interrogator 380, which is received and harmonically modulated by transponder 420 to provide a harmonic return signal 360 at F2, which can be for example 2×F1, that is transmitted by the transponder 420 back to the interrogator 380 to determine precise location of the transponder. With the harmonic ranging system, the doubling of the transmitted signal 320 by the transponder can be used to differentiate the retransmitted transponder signal from a signal reflected for example by scene clutter.

Figure 10:
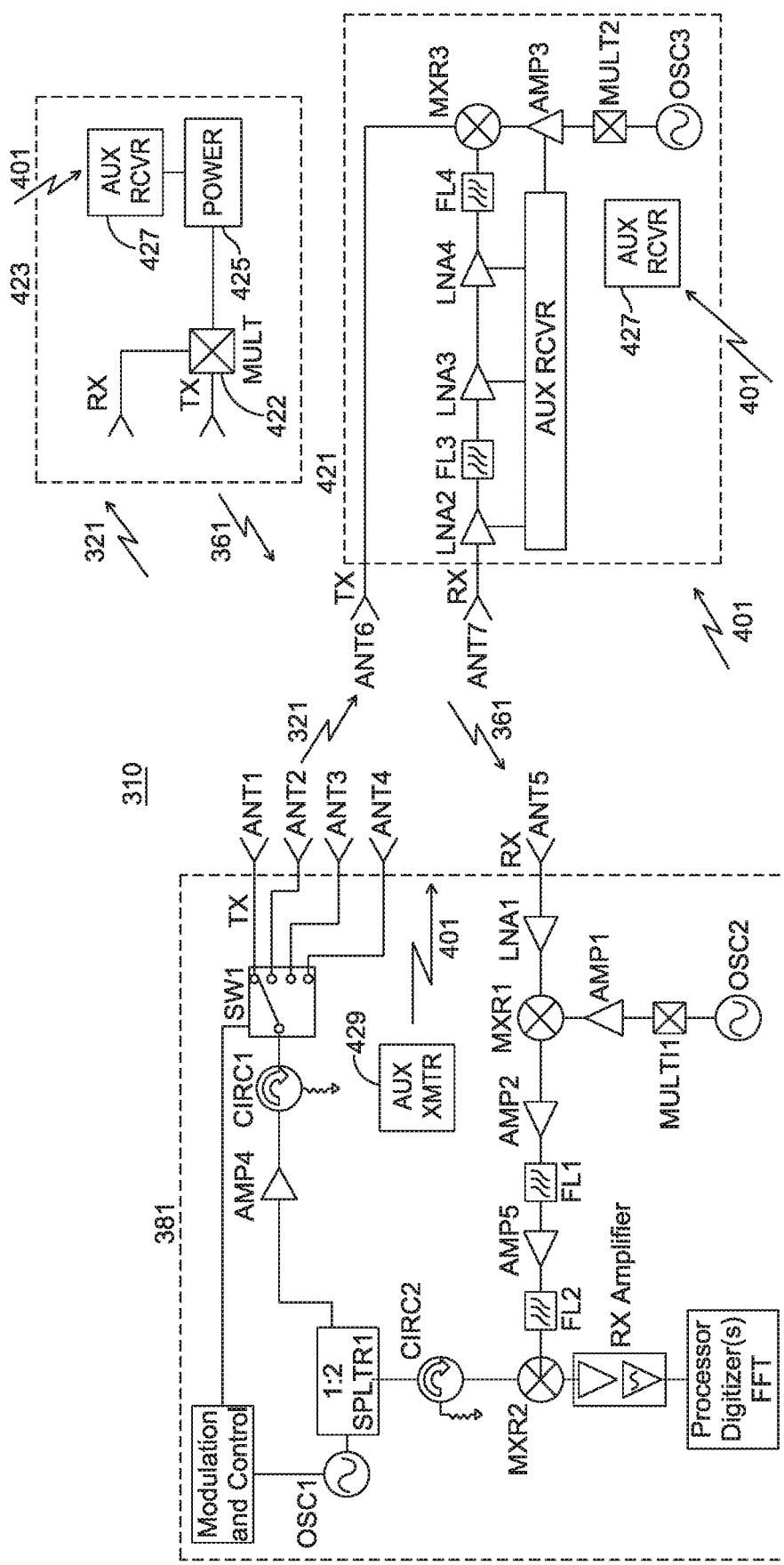
FIG. 10 illustrates another embodiment of a system for measuring location with precision with modulated TOF signals.

As illustrated by FIGS. 3 and 9-10 along with the discussion above, a transponder 42, 420, 421, 423 may translate a received frequency F1 to a response frequency F2 and the response frequency F2 may be harmonically related to F1. A simple harmonic transponder device capable of doing so may include a single diode used as a frequency doubler, or multiplier, coupled to one or more antennas. FIG. 9 illustrates a simple harmonic transponder 423 that includes a receive antenna RX, a multiplier 422 that can simply be a diode, an optional battery 425, and an optional auxiliary receiver 427. FIG. 3 shows a transponder 42 having a single antenna for both receiving and transmitting signals to and from the transponder 42, while FIG. 9 shows separate antennas (labelled RX,TX) for both receiving and transmitting signals to and from the transponders 420, 423. It is appreciated that embodiments of any transponder 42, 420, 421, and 423 as disclosed herein, may have may have one shared antenna, may have multiple antennas such as a TX and an RX antenna, and may include different antenna arrangements.

An embodiment of transponder 42, 420, 421, 423 can include a frequency multiplying element 422, such as but not limited to a diode, integrated into an antenna structure. For example, a diode may be placed upon and coupled to a conducting structure, such as a patch antenna or microstrip antenna structure, and placed in a configuration so as to match impedance of a received and/or transmitted signal so as to be capable of exciting antenna modes at each of the receive and response frequencies.

An embodiment of a passive harmonic transponder 423 includes a low power source such as a battery 425 (for example a watch battery), which can be used to reverse bias the diode multiplier 422 to normally be off, and the low power source can be turned off to turn the harmonic transponder to an on state (a wake up state) to multiply or otherwise harmonically shift a frequency of a received signal. The low power source can be used to reverse bias the multiplier 422 to turn on and off the transponder, for example in applications like those discussed herein. According to an embodiment of the transponder, the power source 425 can also be configured to forward bias the multiplexer (diode) 422 to increase the sensitivity and increase the range of the transponder to kilometer range up from for example, a 10-100 meter range. In still another embodiment, amplification (LNA, LNA2, LNA3, LNA4) either solely or in combination with forward biasing of the multiplier diode 422, may also or alternatively be used to increase sensitivity of the transponder. It is appreciated that in general, amplification may be employed with any transponder to increase the sensitivity of any of the embodiments of a transponder of any of the ranging systems as disclosed herein.

According to aspects and embodiments, the diode-based transponder 423 can be a passive transponder that is configured to use very little power and may be powered via button-type or watch battery, and/or may be powered by energy harvesting techniques. This embodiment of the transponder is configured to consume low amounts of energy with the transponder in the powered off mode most of the time, and occasionally being switched to a wake up state. It is appreciated that the reverse biasing of the diode and the switching on and off of the diode bias takes little power. This would allow passive embodiments of the transponder 423 to run off of watch batteries or other low power sources, or to even be battery-less by using power harvesting techniques, for example from the TOF electromagnetic signals, or from motion, such as a piezoelectric source, a solenoid, or an inertial generator, or from a light source, e.g., solar. With such an arrangement, the interrogator 38, 380, 381 can include an auxiliary wireless transmitter 429 and the transponder 42, 420, 421, and 423 can include an auxiliary wireless receiver 427 as discussed herein, particularly with respect to FIGS. 3, 9-10, that is used to address each transponder to tell each transponder when to wake up. The auxiliary signal transmitted by auxiliary wireless transmitter 429 and received by auxiliary wireless receiver 427 is used to address each transponder to tell each transponder when to turn on and turn off. One advantage of providing the interrogator with the auxiliary wireless transmitter 429 and each transponder with an auxiliary wireless signal receiver 427 is that it provides for the TOF signal channel to be unburdened by unwanted signal noise such as, for example, communication signals from transponders that are not being used. With that said, it is also appreciated that another embodiment of the TOF system could in fact use the TOF signal channel to send and receive radio/control messages to and from the transponders to tell transponders to turn on and off, etc. With such an arrangement, the auxiliary wireless receiver 427 is optional.

It is appreciated that embodiments of the passive harmonic transponder 423 do not require a battery source that needs to be changed every day/few days. The passive harmonic transponder 423 can either have a long-life battery or for shorter range applications may be wirelessly powered by the main channel signal or by an auxiliary channel signal for longer range (e.g. the interrogator and transponder can operate over the 3-10 GHz range, while power harvesting can occur using either or both of the main signal range and a lower frequency range such as, for example, 900 MHz or 13 MHz. In contrast, classic harmonic radar tags simply respond as a chopper to an incoming signal, such that useful tag output power levels require very strong incoming signals such as >−30 dBm at the tag from a transmitter. It is appreciated that the passive harmonic transponder 423 provides a compact, long/unlimited lifetime long-range transponder by storing energy to bias the diode, drastically increasing the diode sensitivity and range of the transponder to, for example, 1 km scales.

One aspect of the embodiment shown in FIG. 9 of a modulation ranging system, or any of the embodiments of a ranging system as disclosed herein, is that each transponder 420 can be configured with an auxiliary wireless receiver 427 to be uniquely addressable by an auxiliary wireless signal 401 from the auxiliary wireless transmitter 429, such as for example a blue tooth signal, a Wi-Fi signal, a cellular signal, a Zigbee signal and the like, which can be transmitted by the interrogator 380. Thus, the interrogator 380 can be configured with an auxiliary wireless transmitter 429 to transmit an auxiliary wireless signal 401 to identify and turn on a particular transponder 420. For example, the auxiliary wireless signal 401 could be configured to turn on each transponder based on each transponder's serial number. With this arrangement, each transponder could be uniquely addressed by an auxiliary wireless signal provided by the interrogator. Alternately, an auxiliary signal to address and enable individual or groups of transponders may be an embedded control message in the transmitted interrogation signal, which may take the form of command protocols or unique codes. In other embodiments the auxiliary signal to enable a transponder may take various other forms.

As shown in FIG. 9, a transmitter portion of an interrogator 380 transmits via an antenna 400 a signal 320 having a frequency F1. The transponder can be prompted to wake up by auxiliary wireless transmitter 429 transmitting an auxiliary wireless signal and the transponder receiving with an auxiliary wireless receiver 427 the auxiliary wireless signal 401, such that the transponder 420 receives the transmitted signal 320 having frequency F1, which is doubled in frequency by the transponder to frequency F2 (=2×F1) and is retransmitted by the transponder 420 as signal 360 having frequency F2. A receiver subsystem of the interrogator 380, which is co-located with the transmitter portion of the interrogator 380 receives the retransmitted signal 360 and synchronizes the return signal to measure the precise distance and location between the interrogator 380 and the transponder 420. In particular, by measuring the time delay between the transmitted signal 320 being transmitted and the received signal 360, the system can determine the range from the interrogator to the transponder. In this embodiment, the time delay corresponds to the two-way propagation delay of the transmitted 320 and retransmitted signals 360.

For example, the transmitter portion of the interrogator 380 for measuring precise location of a transponder 420 comprises an oscillator 382 that provides a first signal 320 having a center frequency F1 that is transmitted by the interrogator 380. The transponder apparatus 420 comprises a frequency harmonic translator 422 which receives the first signal 320 having center frequency F1 and translates the signal of frequency F1 to provide a harmonic of the signal F1 having a center frequency F2, for example 2×F1 that is transmitted by the transponder 420 back to the interrogator 380. The interrogator 380 as shown further comprises four receive channels 390, 392, 394, 396 for receiving the signal F2. Each receive channel comprises a mixer 391, 393, 395, 397 which receives the second signal 360 at frequency F2 and down converts the return signal 360. The interrogator apparatus further comprises a detector which detects the return signal, an analog-to-digital converter and a processor to determine a precise measurement of the time delay between the transmitted signal 320 and the received signal 360 to determine the round trip range from the interrogator 380 to the transponder 420 and back to the interrogator 380 so as to determine the two-way propagation delay.

According to aspects of this embodiment, the interrogator can include four separate receive channels 390, 392, 394, 396 to receive the harmonic return frequencies of the retransmitted signal 401 in a spatially diverse array for the purpose of navigation. It is appreciated that the first signal 320 having a center frequency F1 can be varied in frequency according to any of the modulation schemes that have been discussed herein, such as, for example FMCW, and that the modulation could also be any of CW pulsed, pulsed, impulse, or any other waveform. It is to be appreciated that any number of channels can be used. It is also to be appreciated that in the four receive channels of the interrogator can either be multiplexed to receive the signal 360 at different times or can be configured to operate simultaneously. It is further appreciated that, at least in part because modulation is being used, the interrogator 380 and the transponder 420 can be configured to operate simultaneously.

It is to be appreciated that according to aspects and embodiments disclosed herein, the modulator can use different forms of modulation. For example, as noted above direct sequence spread spectrum (DSSS) modulation can be used. In addition, other forms of modulation such as Doppler modulation, amplitude modulation, phase modulation, coded modulation such as CDMA, or other known forms of modulation can be used either in combination with a frequency or harmonic translation or instead of a harmonic or frequency translation. In particular, the interrogator signal 320 and the transponder signal 360 can either be at the same frequency, i.e. F1, and a modulation of the interrogator signal by the transponder 420 can be done to provide the signal 360 at the same frequency F1, or the interrogator can also frequency translate the signal 320 to provide the signal 360 at a second frequency F2, which may be at a harmonic of F1, in addition to modulate the signal F1, or the interrogator can only frequency translate the signal 320 to provide the signal 360. As noted above, any of the noted modulation techniques provide the advantage of distinguishing the transponder signal 360 from background clutter reflected signal 320. It is to be appreciated that with some forms of modulation, the transponders can be uniquely identified by the modulation, such as coded modulation, to respond to the interrogation signal so that multiple transponders 420 can be operated simultaneously. In addition, as been noted herein, by using a coded waveform, there need not be a translation of frequency of the retransmitted signal 360, which has the advantage of providing a less expensive solution since no frequency translation is necessary.

It is to be appreciated that according to aspects and embodiments of any of the ranging system as disclosed herein, multiple channels may be used by various of the interrogator and transponder devices, for example, multiple frequency channels, quadrature phase channels, or code channels may be incorporated in either or both of interrogation or response signals. In other embodiments, additional channel schemes may be used. For example, one embodiment of a transponder 42, 420, 421, 423 can have both in phase and 90° out of phase (quadrature) channels with two different diodes where the diodes are modulated in quadrature by reverse biasing of the diodes. With such an arrangement, the interrogator could be configured to send coded waveform signals to different transponders simultaneously. In addition, other methods as discussed herein, such as polarization diversity, time sharing, a code-multiplexed scheme where each transponder has a unique pseudo-random code to make each transponder uniquely addressable, and the like provide for allow increased numbers of transponders to be continuously monitored at full energy sensitivity.

FIG. 10 illustrates another embodiment of a modulation ranging system 310. This embodiment can be used to provide a transmitted signal at frequency F1 from interrogator 381, which is received by transponder 421 and frequency translated by transponder 421 to provide a frequency shifted return signal 361 at F2, which can be arbitrarily related in frequency to F1 of the interrogator signal (it doesn't have to be a harmonic signal), that is transmitted by the transponder 421 back to the interrogator 381 to determine precise location of the transponder 421. With this arrangement illustrated in FIG. 10, for example the signal 321 at F1 can be at the 5.8 GHz Industrial Scientific and Medical band, and the return signal 361 at F2 can be in the 24 GHz ISM band. It is to be appreciated also that with this arrangement of a modulation system, the frequency shifting of the transmitted signal 321 by the transponder 421 can be used to differentiate the retransmitted transponder signal 361 from a signal reflected for example by background clutter.

One aspect of this embodiment 310 of a modulation ranging system or any of the embodiments of a ranging system as disclosed herein is that each transponder 42, 420, 421, 423 can be configured to be uniquely addressable to wake up each transponder by receiving with an auxiliary wireless receiver 427 an auxiliary wireless signal 401 from an auxiliary wireless transmitter 429, such as for example a blue tooth signal, a Wi-Fi signal, a cellular signal, a Zigbee signal, and the like, which auxiliary wireless signal can be transmitted by the interrogator 381. Thus, the interrogator 381 can be configured with an auxiliary signal transmitter 429 to transmit an auxiliary wireless signal 401 to identify and turn on a particular transponder 42, 420, 421, 423. For example, the auxiliary wireless signal could be configured to turn on each transponder based on each transponder's serial number. With this arrangement, each transponder could be uniquely addressed by an auxiliary wireless signal provided by the interrogator or another source.

With respect to FIG. 10, it is appreciated that an oscillator such as OSC3 will have finite frequency error that manifests itself as finite estimated position error. One possible mitigation with a low cost TCXO (temperature controlled crystal oscillator) used for OSC3 is to have a user periodically touch their transponder to a calibration target. This calibration target is equipped with magnetic, optical, radar, or other suitable close range high precision sensors to effectively null out the position error caused by any long-term or short-term drift of the TCXO or other suitable low cost high stability oscillator. The nulling out is retained in the radar and/or transponder as a set of calibration constants that may persist for minutes, hours, or days depending on the users position accuracy needs.

According to aspects and embodiments the interrogator and each transponder of the system can be configured to use a single antenna (same antenna) to both transmit and receive a signal. For example, the interrogator 38, 380, 381 can be configured with one antenna 40, 400, to transmit the interrogator signal 32, 320, 321 and receive the response signal 36, 360, 361. Similarly, the transponder can be configured with one antenna to receive the interrogator signal 32, 320, 321 and transmit the response signal 36, 360, 361. This can be accomplished, for example, if coded waveforms are used for the signals. Alternatively, where the signals are frequency translated but are close in frequency, such as for example 4.9 GHz and 5.8 GHz, the same antenna can be used. Alternatively or in addition, it may be possible to provide the interrogator signal 32, 320, 321 at a first polarization, such as Left Hand Circular Polarization (LHCP), Right Hand Circular Polarization (RHCP), vertical polarization, horizontal polarization, and to provide the interrogator signal 36, 360, 361 at a second polarization. It is appreciated that providing the signals with different polarizations can also enable a system with the interrogator and the transponder each using a single antenna, thereby reducing costs. It is further appreciated that using circular polarization techniques mitigates the reflections from background clutter thereby reducing the effects of multi-path return signals, because when using circular polarization, the reflected signal is flipped in polarization, and so the multipath return signals could be attenuated by using linear polarizations and/or polarization filters.

According to aspects and embodiments of any of the systems disclosed herein, it is further appreciated that there can be selective pinging of each transponder 42, 420, 421, 423 to wake up each transponder by receiving with an auxiliary wireless receiver 427 an auxiliary wireless signal 401, such as for example a blue tooth signal, a Wi-Fi signal, a cellular signal, a Zigbee signal and the like, which can be transmitted by the interrogator 380 to provide for scene data compression. In particular, there can be some latency when using an auxiliary wireless signal to identify and interrogate each transponder 42, 420, 421, 423. As the number of transponders increases, this can result in slowing down of interrogation of all the transponders. However, some transponders may not need to be interrogated as often as other transponders. For example, in an environment where some transponders may be moving and others may be stationary, the stationary transponders need not be interrogated as often as the transponders that are actively moving. Still others may not be moving as fast as other transponders. Thus, by dynamically assessing and pinging more frequently the transponders that are moving or that are moving faster than other transponders, there can be a compression of the transponder signals, which can be analogized for example to MPEG4 compression where only pixels that are changing are sampled.

According to aspects and embodiments disclosed herein, the interrogators and transponders can be configured with their own proprietary micro-location frequency allocation protocol so that the transponders and interrogators can operate at unused frequency bands that exist amongst existing allocated frequency bands. In addition, the interrogators and transponders can be configured so as to inform users of legacy systems at other frequencies for situational awareness, e.g. to use existing frequency allocations in situations that warrant using existing frequency band allocations. Some advantages of these aspects and embodiments are that it enables a control for all modes of travel (foot, car, aerial, boat, etc.) over existing wired and wireless backhaul networks, with the interrogators and the transponders interoperating with existing smart vehicle and smart phone technologies such as Dedicated Short Range Communications (DSRC) and Bluetooth Low Energy (BLE) radio.

In particular, aspects and embodiments are directed to high power interrogators in license-free bands e.g. 5.8 GHz under U-NII and frequency sharing schemes via dynamic frequency selection and intra-pulse sharing wherein the system detects other loading issues such as system timing and load factor, and the system allocates pulses in between shared system usage. One example of such an arrangement is dynamic intra pulse spectrum notching on the fly. Another aspect of embodiments disclosed herein is dynamic allocation of response frequencies by a lower power transponder at license-free frequency bands (lower power enables wider selection of transponder response frequencies).

Another aspect of embodiments of interrogators and transponders disclosed herein is an area that has been configured with a plurality of interrogators (a localization enabled area) can have each of the transponders enabled with BLE signal emitting beacons (no connection needed), as has been noted herein. With this arrangement, when a user having a transponder, such as a wearable transponder, enters into the localization area, the transponder "wakes up" to listen for the BLE interrogation signal and replies as needed. It is also appreciated that the transponder can be configured to request an update on what's going on, either over the BLE channel or another frequency channel, such as a dynamically allocated channel.

Some examples of applications where this system arrangement can be used are for example as a human or robot walks, drives, or pilots a vehicle or unmanned vehicle through any of for example a dense urban area, a wooded area, or a deep valley area where direct line of sight is problematic and multipath reflections cause GNSS navigation solutions to be highly inaccurate or fail to converge altogether. The human or robot or vehicle or unmanned vehicle can be equipped with such configured with transponders and interrogators can be configured to update the transponders with their current state vector as well as broadcast awareness of their state vector over preselected or dynamically selected frequency using wireless protocols, Bluetooth Low Energy, DSRC, and other appropriate mechanisms for legal traceability (accident insurance claims, legal compliance).

One implementation can be for example with UDP multicasting, wherein the transponders are configured to communicate all known state vectors of target transponders with UDP multicast signals. The UDP multicast encrypted signals can be also be configured to be cybersecurity protected against spoofing, denial of service and the like. One practical realization of the network infrastructure may include: Amazon AWS IoT service, 512 byte packet increments, TCP Port 443, MQTT protocol, designed to be tolerant of intermittent links, late to arrive units, and brokers and logs data for traceability, and machine learning.

Wide-Band or Ultra-Wide-Band Ranging Systems.

Figure 4:
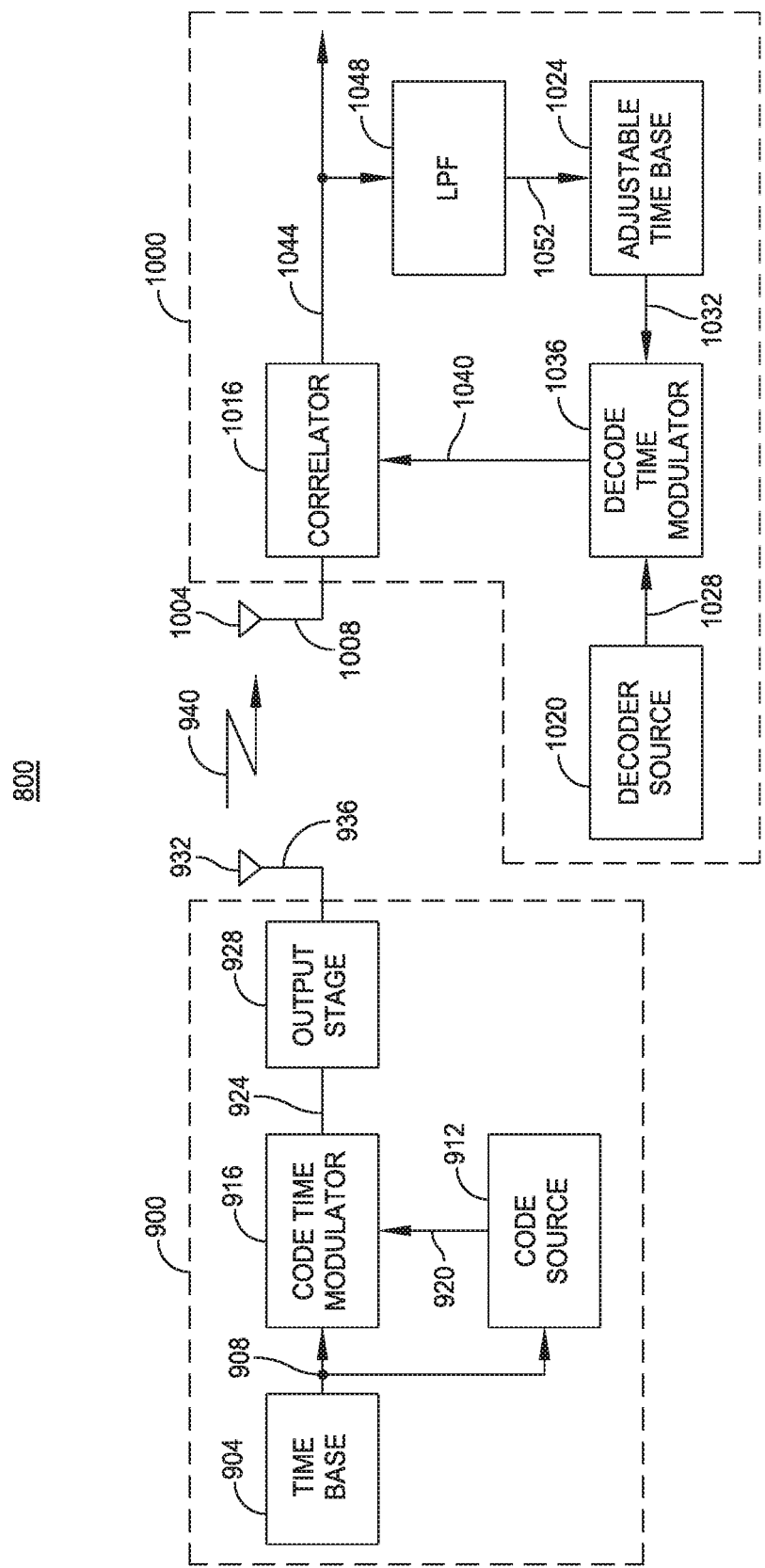
FIG. 4 illustrates one embodiment of a system for measuring distance with precision based on wide-band, ultra-wide-band pulsed signals, or any pulse compressed waveform.

FIG. 4 illustrates an embodiment of a wide-band or ultra-wide-band impulse ranging system 800. The system includes an impulse radio transmitter 900. The transmitter 900 comprises a time base 904 that generates a periodic timing signal 908. The time base 904 comprises a voltage controlled oscillator, or the like, which is typically locked to a crystal reference, having a high timing accuracy. The periodic timing signal 908 is supplied to a code source 912 and a code time modulator 916.

The code source 912 comprises a storage device such as a random access memory (RAM), read only memory (ROM), or the like, for storing codes and outputting the codes as code signal 920. For example, orthogonal PN codes are stored in the code source 912. The code source 912 monitors the periodic timing signal 908 to permit the code signal to be synchronized to the code time modulator 916. The code time modulator 916 uses the code signal 920 to modulate the periodic timing signal 908 for channelization and smoothing of the final emitted signal. The output of the code time modulator 916 is a coded timing signal 924.

The coded timing signal 924 is provided to an output stage 928 that uses the coded timing signal as a trigger to generate electromagnetic pulses. The electromagnetic pulses are sent to a transmit antenna 932 via a transmission line 936. The electromagnetic pulses are converted into propagating electromagnetic waves 940 by the transmit antenna 932. The electromagnetic waves propagate to an impulse radio receiver through a propagation medium, such as air.

FIG. 4 further illustrates an impulse radio receiver 1000. The impulse radio receiver 1000 comprises a receive antenna 1004 for receiving a propagating electromagnetic wave 940 and converting it to an electrical received signal 1008. The received signal is provided to a correlator 1016 via a transmission line coupled to the receive antenna 1004.

The receiver 1000 comprises a decode source 1020 and an adjustable time base 1024. The decode source 1020 generates a decode signal 1028 corresponding to the code used by the associated transmitter 900 that transmitted the signal 940. The adjustable time base 1024 generates a periodic timing signal 1032 that comprises a train of template signal pulses having waveforms substantially equivalent to each pulse of the received signal 1008.

The decode signal 1028 and the periodic timing signal 1032 are received by the decode timing modulator 1036. The decode timing modulator 1036 uses the decode signal 1028 to position in time the periodic timing signal 1032 to generate a decode control signal 1040. The decode control signal 1040 is thus matched in time to the known code of the transmitter 900 so that the received signal 1008 can be detected in the correlator 1016.

An output 1044 of the correlator 1016 results from the multiplication of the input pulse 1008 and the signal 1040 and integration of the resulting signal. This is the correlation process. The signal 1044 is filtered by a low pass filter 1048 and a signal 1052 is generated at the output of the low pass filter 1048. The signal 1052 is used to control the adjustable time base 1024 to lock onto the received signal. The signal 1052 corresponds to the average value of the correlator output, and is the lock loop error signal that is used to control the adjustable time base 1024 to maintain a stable lock on the signal. If the received pulse train is slightly early, the output of the low pass filter 1048 will be slightly high and generate a time base correction to shift the adjustable time base slightly earlier to match the incoming pulse train. In this way, the receiver is held in stable relationship with the incoming pulse train.

It is appreciated that this embodiment of the system can use any pulse compressed signal. It is also appreciated that the transmitter 900 and the receiver 1000 can be incorporated into a single transceiver device. First and second transceiver devices according to this embodiment can be used to determine the distance d to and the position of an object. Further reference to functionalities of both a transmitter and a receiver are disclosed in U.S. Pat. No. 6,297,773 System and Method for Position Determination by Impulse Radio, which is herein incorporated by reference.

Linear FM and FHSS FMCW Ranging Systems.

Figure 5:
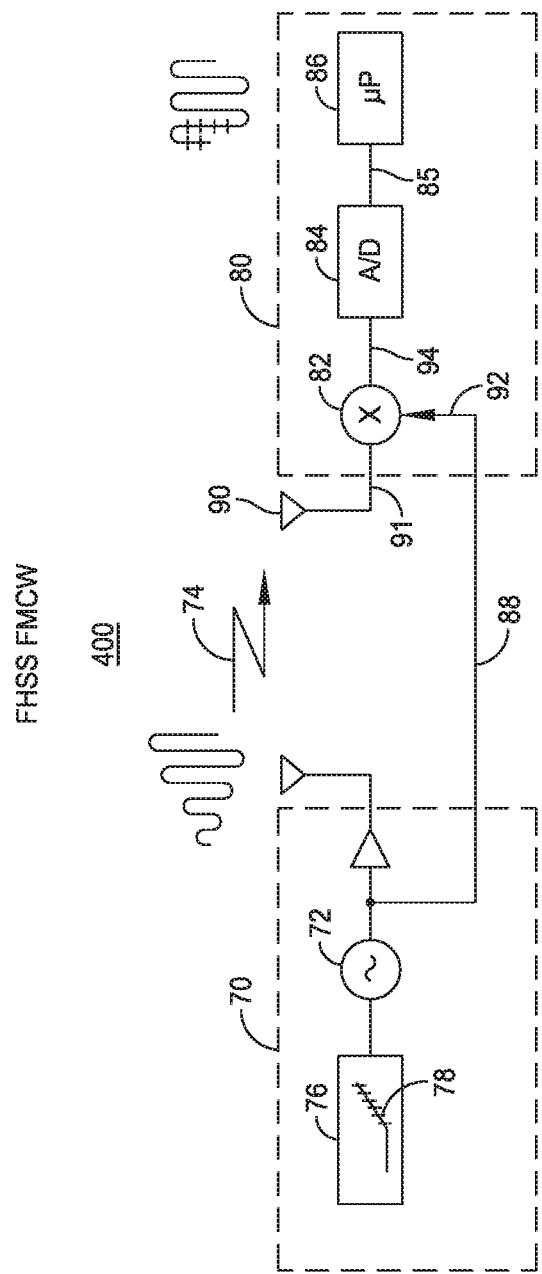
FIG. 5 illustrates one embodiment of a system for measuring distance with precision based on DSSS or frequency hopping spread spectrum (FHSS) FMCW ranging techniques.

Referring to FIG. 5, there is illustrated another embodiment of a ranging system 400 implemented according to the present invention that can use either linear FMCW ranging or frequency hopping spread spectrum (FHSS) FMCW ranging signals and techniques.

According to one embodiment implementing linear FMCW ranging, a transmitted signal 74 is swept through a linear range of frequencies and transmitted as transmitted signal 74. For one way linear TOF FMCW ranging, at a separate receiver 80, a linear decoding of the received signal 74 and a split version of the linear swept transmitted signal are mixed together at a mixer 82 to provide a coherent received signal corresponding to the TOF of the transmitted signal. Because this is done at a separate receiver 80, it yields a one-way TOF ranging.

Figure 11:
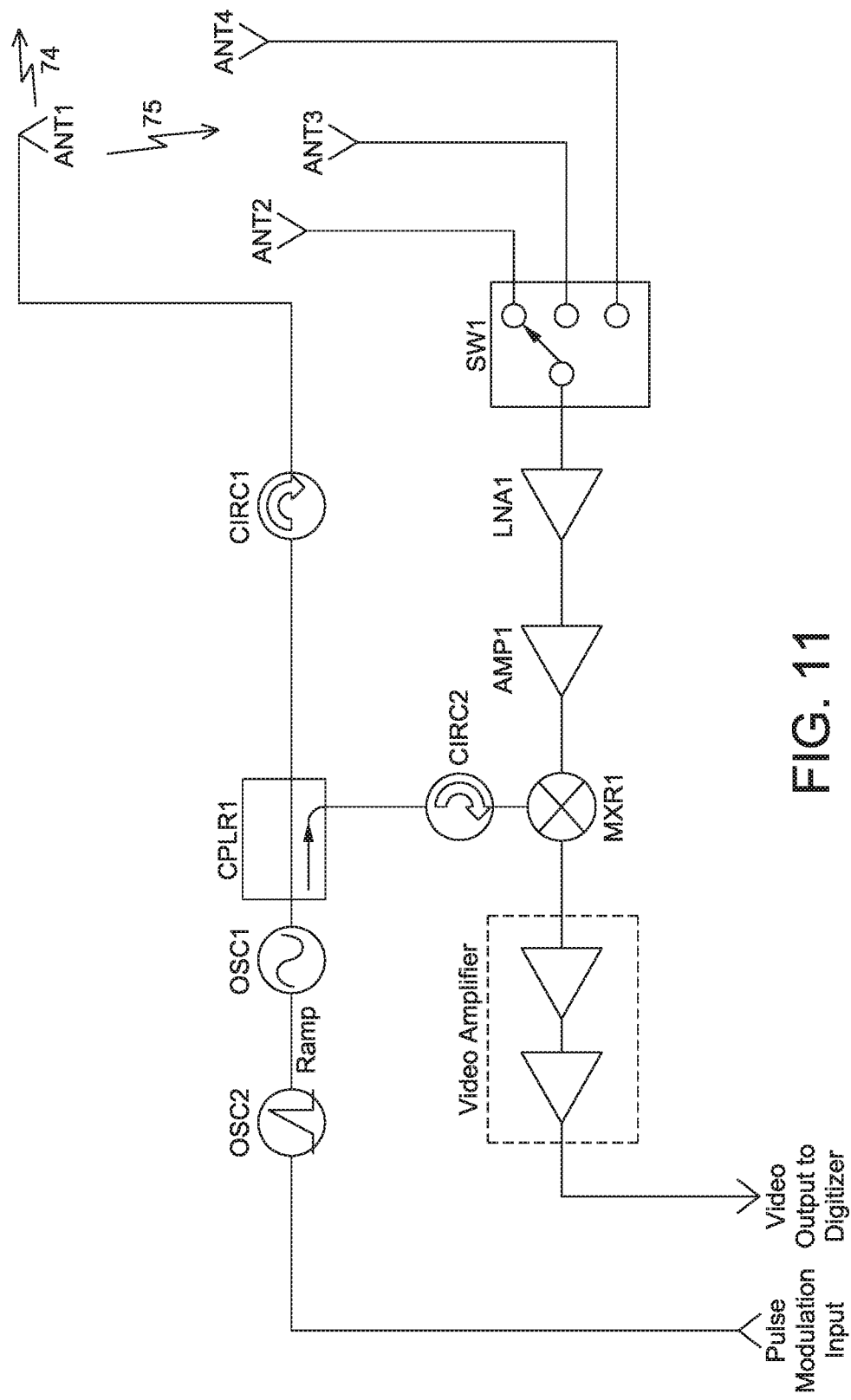
FIG. 11 illustrates a block diagram of an interrogator for linear FMCW two-way TOF ranging.

FIG. 11 illustrates a block diagram of an embodiment of an interrogator for linear FMCW two-way TOF ranging. In the Embodiment of FIG. 11, an interrogator transmits via antenna 1 (ANT1) a linear FM modulated chirp signal 74 (or FMCW) towards a transponder (not illustrated) as shown for example in FIG. 5. The transponder can for example frequency shift the linear FM modulated chirp signal 74 and re-transmit a frequency shifted signal 75 at different frequency as discussed herein for aspects of various embodiments of a transponder. For example, as discussed herein, a transponder tag is tracked by receiving, amplifying, then frequency mixing the linear FM modulated interrogation signal and re-transmitting it out at a different frequency. This allows the tag to be easily discernable from clutter, or in other words, so it can be detected among other radar reflecting surfaces. The frequency offset return signal 75 and any scattered return signal 74 are collected by receiver antenna 2 (ANT2), antenna 3 (ANT3) and antenna 4 (ANT4), amplified by a low noise amplifier LNA1 and an Amplifier AMP1, and multiplied by the original chirp signal supplied via the circulator CIRC2 in the mixer MXR1. In the illustrated embodiment the antennas are multiplexed by a single-pole multi-throw switch SW1. The product is amplified via a video amplifier fed out to a digitizer where ranging information can be computed. It is appreciated that although linear FM is discussed in this example any arbitrary waveform can be used including but not limited to impulse, barker codes, or any pulse or phase coded waveforms of any kind. The interrogator and the transponder can work with any arbitrary waveforms including but not limited to linear FM (or FMCW), impulse, pulsed CW, barker codes, or any other modulation techniques that fits within the bandwidth of its signal chain.

Figure 12:
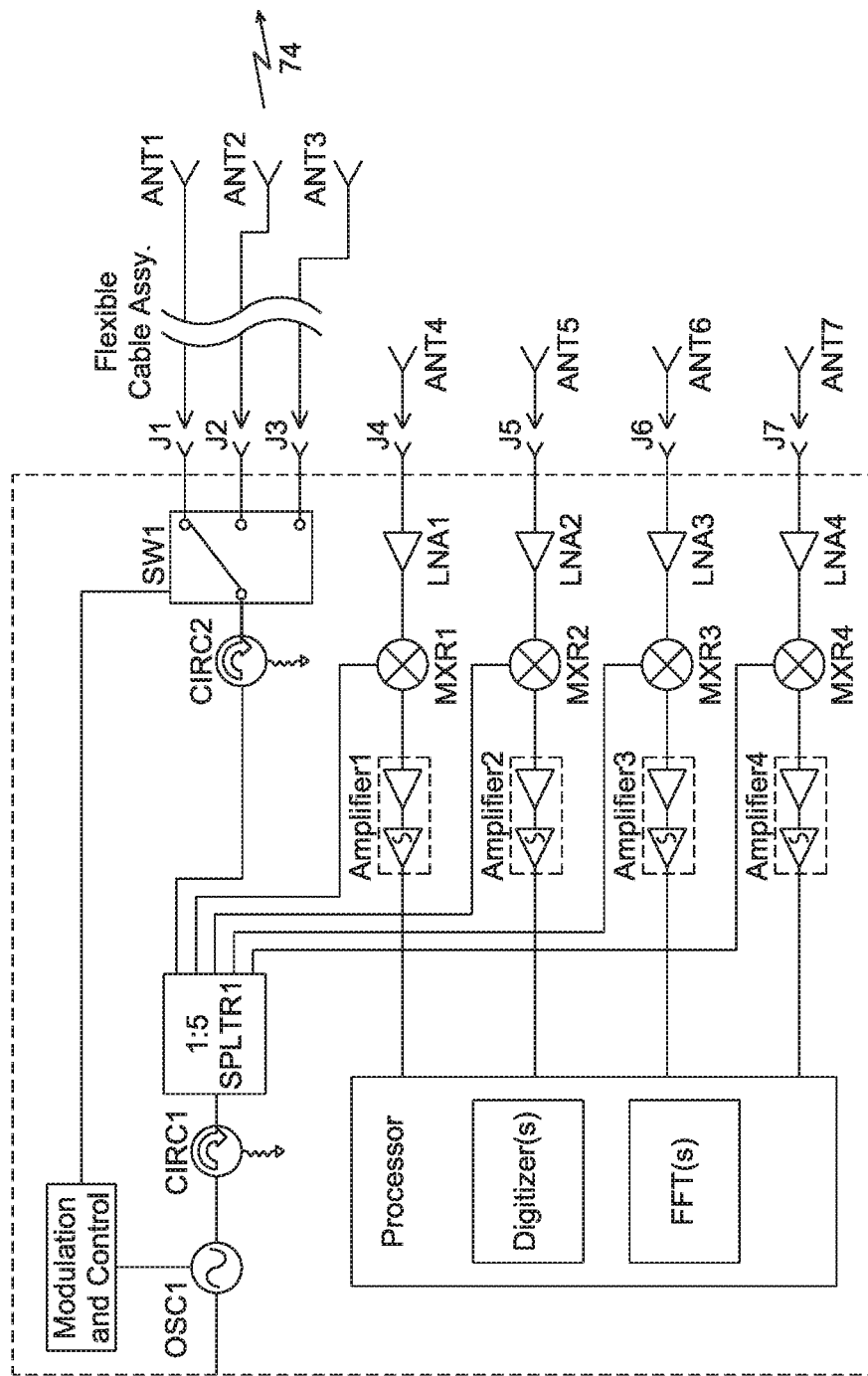
FIG. 12 illustrates another embodiment of a block diagram of an interrogator for linear FMCW two-way TOF ranging.

FIG. 12 illustrates another embodiment of a block diagram of an interrogator for linear FMCW two-way TOF ranging. This embodiment differs from the embodiment of FIG. 11, primarily in that the interrogator has three transmit antennas to allow for three dimensional ranging of the interrogator and four receive channels for receiving the re-transmitted signal. This embodiment was prototyped and tested. The transmitted signal was transmitted with a Linear FM modulation, 10 mS chirp over a 4 GHz bandwidth from 8.5 GHz to 12.5 GHz. The transmitted output power was +14 dBm. With this arrangement, precision localization was measured and achieved to an accuracy of 27 um in Channel 0, 45 um in Channel 1, 32 um in Channel 2 and 59 um in Channel 3.

With FHSS FMCW ranging, the transmitted signal is not linearly swept through a linear range of frequencies as is done with linear FMCW ranging, instead the transmitted signal is frequency modulated with a series of individual frequencies that are varied and transmitted sequentially in some pseudo-random order according to a specific PN code. It might also exclude particular frequency bands, for example, for purposes of regulatory compliance. For FHSS FMCW ranging at a separate receiver 80 for one way TOF ranging, a decoding of the received signal 74 and a split version of the individual frequencies that are varied and transmitted sequentially according to a specific PN code are mixed together at a mixer 82 to provide a coherent received signal corresponding to the TOF of the transmitted signal. For FHSS FMCW, this is done at a separate receiver 80 for one-way TOF ranging.

More specifically, this embodiment of an apparatus 400 for measuring TOF distance via a linear FHSS FMCW electromagnetic signal comprises a transmitter 70 comprising a local oscillator 72 for generating a signal 74 and a linear ramp generator 76 coupled to the local oscillator that sweeps the local oscillator signal to provide a linear modulated transmitted signal 74 for linear modulation. According to the FHSS FMCW embodiment, instead of a linear ramp generator, the signal provided to modulate the local oscillator signal is broken up into discrete frequency signals 78 that modulate the local oscillator signal to provide a series of individual frequencies according to a specific PN code for modulating the local oscillator signal. The modulated transmitted signal 74 modulated with the series of individual frequencies are transmitted sequentially in some pseudorandom order, according to a specific PN code, as the transmitted signal. For one-way TOF measurements, a split off version of the transmitted signal is also fed via a cable 88 to a receiver 80. The receiver 80 receives the transmitted signal at an antenna 90 and forwards the received signal to a first port 91 of the mixer. The mixer also receives the signal on cable 88 at a second port 92 and mixes the signal with the received signal 74, to provide at an output 94 of the mixer a signal corresponding to the time of flight distance between the transmitter 70 and the receiver 80 of the transmitted signal 74 that is either linear modulated (for linear FMCW) or modulated with the PN codes of individual frequencies (for FHSS FMCW). The apparatus further comprises an analog to digital converter 84 coupled to an output 94 of the mixer 82 that receives that signal output from the mixer and provides a sampled output signal 85. The sampled output signal 85 is fed to a processor 86 that performs a FFT on the sampled signal. According to aspects of this embodiment, the ranging apparatus further comprises a frequency generator configured to provide signals at a plurality of discrete frequencies and processor to provide a randomized sequence of the individual frequency signals.

It is appreciated that this embodiment of the system can use any pulse compressed signal.

It is desirable to make the interrogators and the transponders as have been discussed herein as small as possible and as cheap as possible, so that the interrogators and transponders can be used anywhere and for anything. This it is desirable to implement as much of the interrogator structure and functionality and as much of the transponder structure and functionality as can be done on a chip. It is appreciated that one of the most inexpensive forms of manufacturing electronic devices is as a CMOS implementation. Accordingly, aspects and embodiments of the interrogators and transponders as described herein are to be implemented as CMOS.

Multiple Transmitter and/or Transceivers

Figure 6:
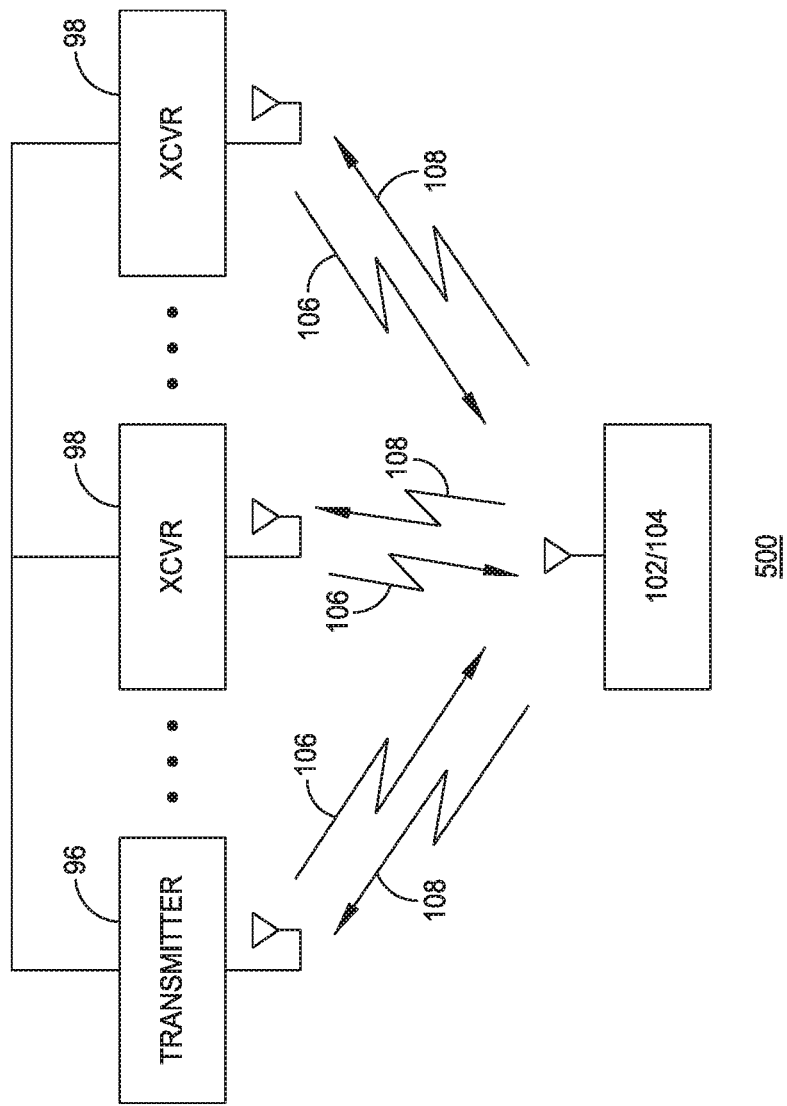
FIG. 6 illustrates one embodiment of a system for measuring distance with precision with TOF signals having multiple transmitters, multiple transceivers, or a hybrid combination of transmitter and transceivers.
Figure 7:
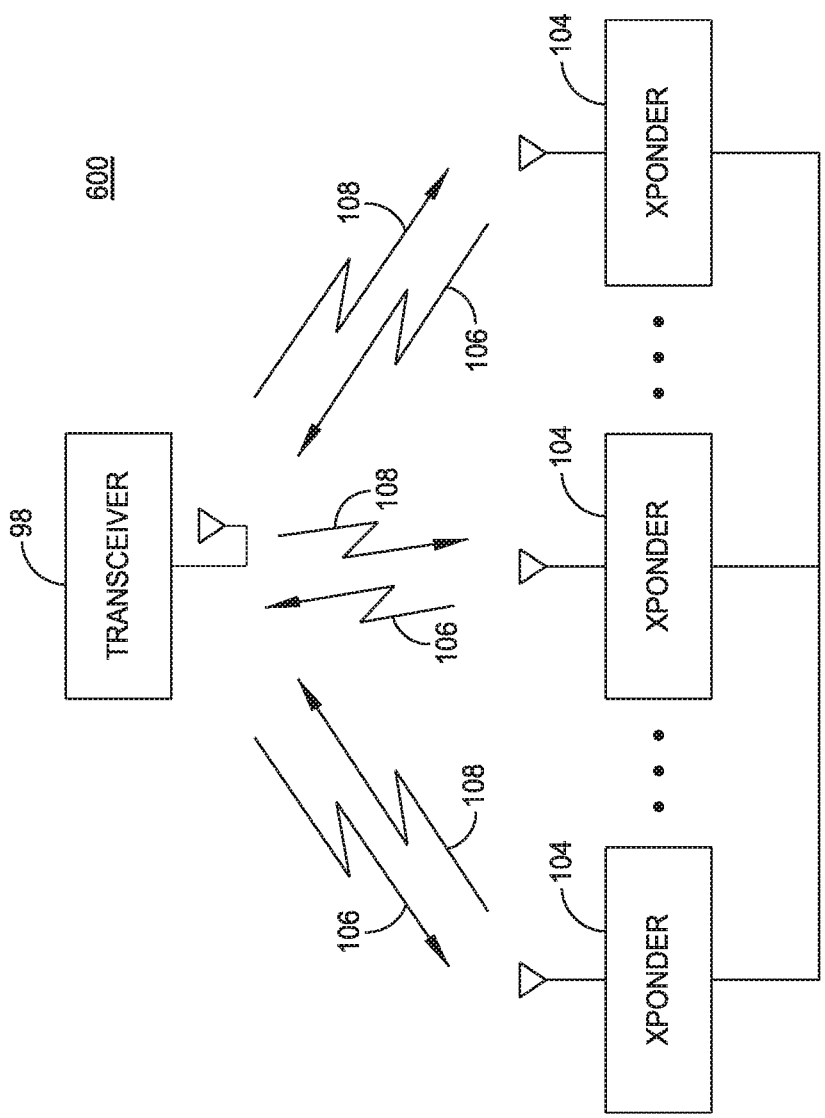
FIG. 7 illustrates one embodiment of a system for measuring distance with precision with TOF signals having multiple receivers, multiple transponders, or a hybrid combination of receivers and transponders.

Referring to FIG. 6, it is to be appreciated that various embodiments of a ranging system 500 according to the invention can comprise multiple transmitters 96, multiple transceivers 98, or a combination of both transmitter and transceivers that transmit a transmitted signal 106 that can be any of the signals according to any of the embodiments described herein. Such embodiments include at least one receiver 102 that either receives the transmitted signal 106 from each transmitter and/or at least one transponder 104 that receives the transmitted signal and re-transmits a signal 108 that is a re-transmitted version of the transmitted signal 106 back to a plurality of transceivers 98, according to any of ranging signals and systems described herein.

One example of a system according to this embodiment includes one transceiver 98 (interrogator) that transmits a first interrogation signal 106 to at least one transponder 104, which transponder can be attached to an object being tracked. The at least one transponder retransmits a second re-transmitted signal 108 that is received by, for example second, third, and fourth transceivers 98 to determine a position and a range of the transponder and the object being tracked. For example two transceivers can be grouped in pairs to do hyperbolic positioning and three transceivers can be grouped to do triangulation position to the transponder/object. It is appreciated that any of the transceivers 98 can be varied to be the interrogator that sends the first transmit interrogation signal to the transponder 104 and that any of the transceivers 98 can be varied to receive the re-transmitted signal from the responder. It is appreciated that where ranging to the transponder is being determined at the transceivers, the range and position determination is a time of flight measurement between the signals transmitted by the transponder 104 and received by at least two of the transceivers 98.

Another example of a system according to this embodiment includes at least one transponder 104, which can be attached to an object being tracked. The at least one transponder 104 receives a signal 106 that is transmitted by any of at least first, second, third, and fourth transceivers 98 (interrogators). The signal can be coded to ping at least one of the transponders. It is appreciated that more than one transponder 104 can be provided. It is appreciated that each transponder can be coded to respond to a different ping of the transmitted signal 106. It is appreciated that multiple transponders can be coded to respond to a same ping of the transmitted signal 106. Thus, it is appreciated that one transponder or any of a plurality of transponders or a plurality of the transponders can be pinged by the signal 106 transmitted by at least one of the transceivers 98. It is appreciated that multiple transceivers can be configured to send a signal 106 having a same code/ping. It is also appreciated that each transceiver can be configured to send a transmitted signal having a different code/ping. It is further appreciated that pairs or more of transceivers can be configured to send a signal having the same code/ping. It is also appreciated that pairs or more of the transponders can be configured to respond to a signal having the same code/ping. It is appreciated that where the range to the transponder is being determined at the transponder (the device being tracked), the range determination is a time difference of arrival measurement between the signal transmitted by at least two of the transceivers 98. For example, where the transponder is pinged by two of the transceivers 98 a hyperbolic positioning of the transponder (object) can be determined. Where the transponder is pinged by three of the transceivers 98, triangulation positioning of the transponder (object) can be determined.

Alternatively, instead of coding each signal with a ping, it is appreciated that according to some embodiments a precise time delay can be introduced between signals transmitted by the transmitters and/or transceivers. Alternatively, a precise time delay can be introduced between signals re-transmitted by the at least one transponder in response to receipt of the transmitted signal. With this arrangement pairs of transceivers can be used to accomplish 3D or hyperbolic positioning or at least three transceivers can be used to perform triangular positioning according to any of the signals described herein.

Another example of a system according to this embodiment includes one transmitter 96 that is a reference transmitter that provides a waveform by which the receivers 102 and/or transponders 104 correlate against to measure a delta in time of the time difference of arrival (TDOA) signal relative to the reference transmitter 96. It is also appreciated that this embodiment of the system can use any pulse compressed signal.

Multiple Receivers and/or Transponders

Various embodiments of a system according to the invention can comprise at least one transmitter 96 or transceiver 98 that transmits a transmitted 106 signal and a plurality of receivers 102 or transponders 104 that receive the transmitted signal from each transmitter or transceiver, according to any of ranging systems and signals described herein. Such embodiments include at least one transmitter 96 or transceiver 98 that transmits the transmitted signal 106 and a plurality of receivers 102 or transponders 104 that either receive the transmitted signal 106 or receive and re-transmit a signal 108 that is a re-transmitted version of the transmitted signal 106 back to the at least one transceivers 98, according to any of ranging signals and systems described herein.

It is appreciated that according to aspects of this embodiment a transmitter 96 can be attached to an object being tracked and can transmit a first signal 106 to a plurality of receivers 102 to perform time of flight positioning and ranging from the transmitter to the receiver. For example, where two receivers receive the transmitted signal, hyperbolic positioning of the transmitter/object can be achieved. Alternatively or in addition, where at least three receivers receive the transmitted signal 106, triangulation positioning to the transmitter 96 and object can be achieved.

According to aspects of another embodiment, at least one transceiver 98 can be attached to an object being tracked and can transmit a first signal 106 to a plurality of transponders 104 to perform positioning and ranging from the transmitter to the receiver. For example, where two transponders receive and re-transmit the transmitted signal 106, hyperbolic positioning of the transmitter/object can be achieved. Alternatively or in addition, where at least three transponders 104 receive and re-transmit the transmitted signal 106, triangulation positioning to the transceiver 98 and object can be achieved.

It is appreciated that any of the transponders can be varied to respond to the interrogator 98 that sends the first transmit interrogation signal to the transponder 104. It is appreciated that the at least one transponder 104 receives a signal 106 that is transmitted by the transceivers 98 (interrogators). The signal can be coded to ping at least one of the transponders. It is appreciated that each transponder can be coded to respond to a different ping of the transmitted signal 106. It is appreciated that multiple transponders can be coded to respond to a same ping of the transmitted signal 106. It is appreciated that one transponder or any of a plurality of transponders or a plurality of the transponders can be pinged by the signal 106 transmitted by at least one transceivers 98. It is also appreciated that pairs or more of the transponders can be configured to respond to a signal having the same code/ping.

Alternatively, instead of coding each signal with a ping, it is appreciated that according to some embodiments a precise time delay can be introduced between signals re-transmitted by the transponders 104 in response to receipt of the transmitted signal. With this arrangement pairs of transponders can be used to accomplish hyperbolic positioning of the at least one transceiver or at least three transponders can be used to perform triangular positioning according to any of the signals described herein. It is also appreciated that this embodiment of the system can use any pulse compressed signal.

Hybrid Ranging Systems

Figure 8:
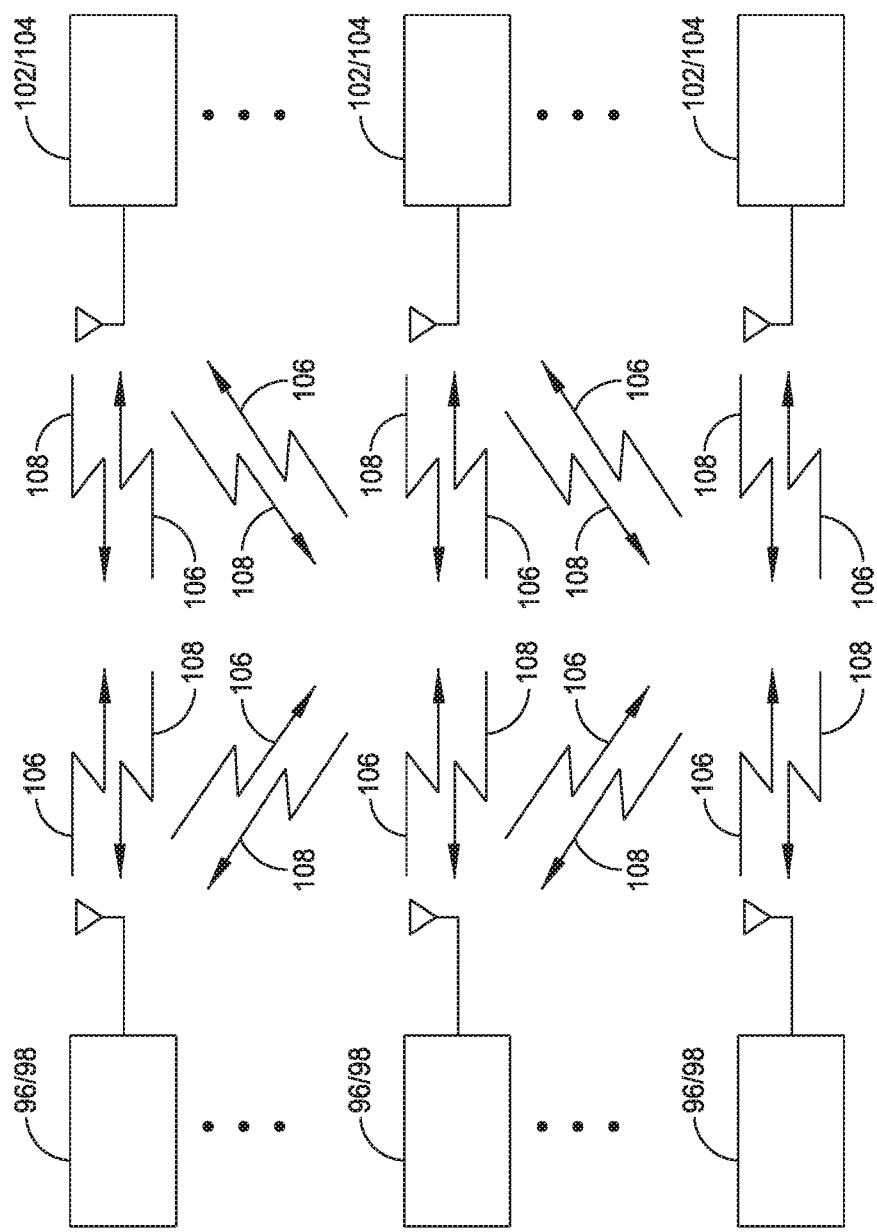
FIG. 8 illustrates one embodiment of a system for measuring distance with precision with TOF signals having multiple transmitters, multiple transceivers, or a hybrid combination of transmitter and transceivers and well as multiple receivers, multiple transponders, or a hybrid combination of receivers and transponders.

Referring to FIG. 8, various embodiments of a system according to the invention can comprise a plurality of transmitters that transmit a transmitted signal and a plurality of receivers that receive a transmitted signal according to any of the signals and systems disclosed herein.

Various embodiments of a system according to the invention can comprise a plurality of transceivers 98 that transmit a transmitted signal and a plurality of transponders 104 that receive the transmitted signal 106 and re-transmit the transmitted signal 108, according to any of ranging signals and ranging systems described herein. It is further appreciated that the plurality of the transmitters 96 or transceiver 98 can be coupled together either by a cable or a plurality of cables e.g. to create a wired mesh of transmitters or transceivers, or coupled together wirelessly to create a wireless mesh of transmitters or transceivers. It is also appreciated that the plurality of the receivers 102 or transponders 104 can be coupled together either by a cable or a plurality of cables e.g. to create a wired mesh of receivers or transponders, or coupled together wirelessly to create a wireless mesh of receivers or transponders. Still further it is appreciated that the system can comprise a mixture of plurality of transmitters and transceivers and/or a mixture of a plurality of receivers or transponders. It is appreciated that the mixture of the plurality of transmitters and transceivers and/or the mixture of a plurality of receivers or transponders can be coupled together either by one or more cables or wirelessly or a combination of one or more cables and wirelessly. Such embodiments can be configured to determine range and positioning to at least one object according to any of the signals and systems that have been described herein.

In order to facilitate communication between the various and disparately located component parts of any of the herein disclosed systems, a network topology or network infrastructure can be utilized. Typically the network topology and/or network infrastructure can include any viable communication and/or broadcast technology, for example, wired and/or wireless modalities and/or technologies can be utilized to effectuate the subject application. Moreover, the network topology and/or network infrastructure can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof.

According to the disclosure above regarding any of the TOF ranging systems disclosed, it will be apparent that a TOF ranging system may be comprised of devices, any of which may transmit, receive, respond, or process signals associated with any of the foregoing TOF ranging systems. In aspects and embodiments, any transceiver, interrogator, transponder, or receiver may determine TOF information in one or more of the manners discussed above in accordance with any of the TOF ranging systems disclosed. Any transmitter, transceiver, interrogator, or transponder may be the source of a signal necessary for determining the TOF information in one or more of the manners discussed above in accordance with any of the TOF ranging systems disclosed.

It is appreciated that in embodiments, the exact position of signal generating and signal processing components may not be significant, but the position of an antenna is germane to precise ranging, namely the position and the location from which an electromagnetic signal is transmitted or received. Accordingly, the TOF ranging systems locations disclosed herein are typically configured to determine by the TOF ranging to antenna positions and locations. For example, the exemplary embodiments discussed above with respect to FIG. 2 and FIGS. 9 to 12 have multi-antenna components, and it is also appreciated that any of the embodiments of interrogators and transponders as disclosed in FIGS. 1-12 can have multiple antennas. In such example embodiments, and others like them, various components may be shared among more than one antenna and TOF ranging can be done to the multiple antenna components. For example, a single oscillator, modulator, combiner, correlator, amplifier, digitizer, or other component may provide functionality to more than one antenna. In such cases, each of the multiple antennas may be considered an individual TOF transmitter, receiver, interrogator, or transponder, to the extent that associated location information may be determined for such antenna.

In aspects and embodiments, multiple antennas may be provided in a single device to take advantage of spatial diversity. For example, an object with any of the TOF ranging components embedded may have multiple antennas to ensure that at least one antenna may be unobstructed at any given time, for example as the orientation of the object changes In one embodiment, a wristband may have multiple antennas spaced at intervals around a circumference to ensure that one antenna may always receive without being obstructed by a wearer's wrist.

In aspects and embodiments, signal or other processing, such as calculations, for example, to determine distances based on TOF information, and positions of TOF devices, may be performed on a TOF device or may be performed at other suitable locations or by other suitable devices, such as, but not limited to, a central processing unit or a remote or networked computing device.

It should be noted without limitation or loss of generality that while persistence devices (e.g., memory, storage media, and the like) are not depicted, typical examples of these devices include computer readable media including, but not limited to, an ASIC (application specific integrated circuit), CD (compact disc), DVD (digital video disk), read only memory (ROM), random access memory (RAM), programmable ROM (PROM), floppy disk, hard disk, EEPROM (electrically erasable programmable read only memory), memory stick, and the like.

Example Applications of Various Embodiments of TOF Ranging Systems

Human-Machine Interaction

Figure 13:
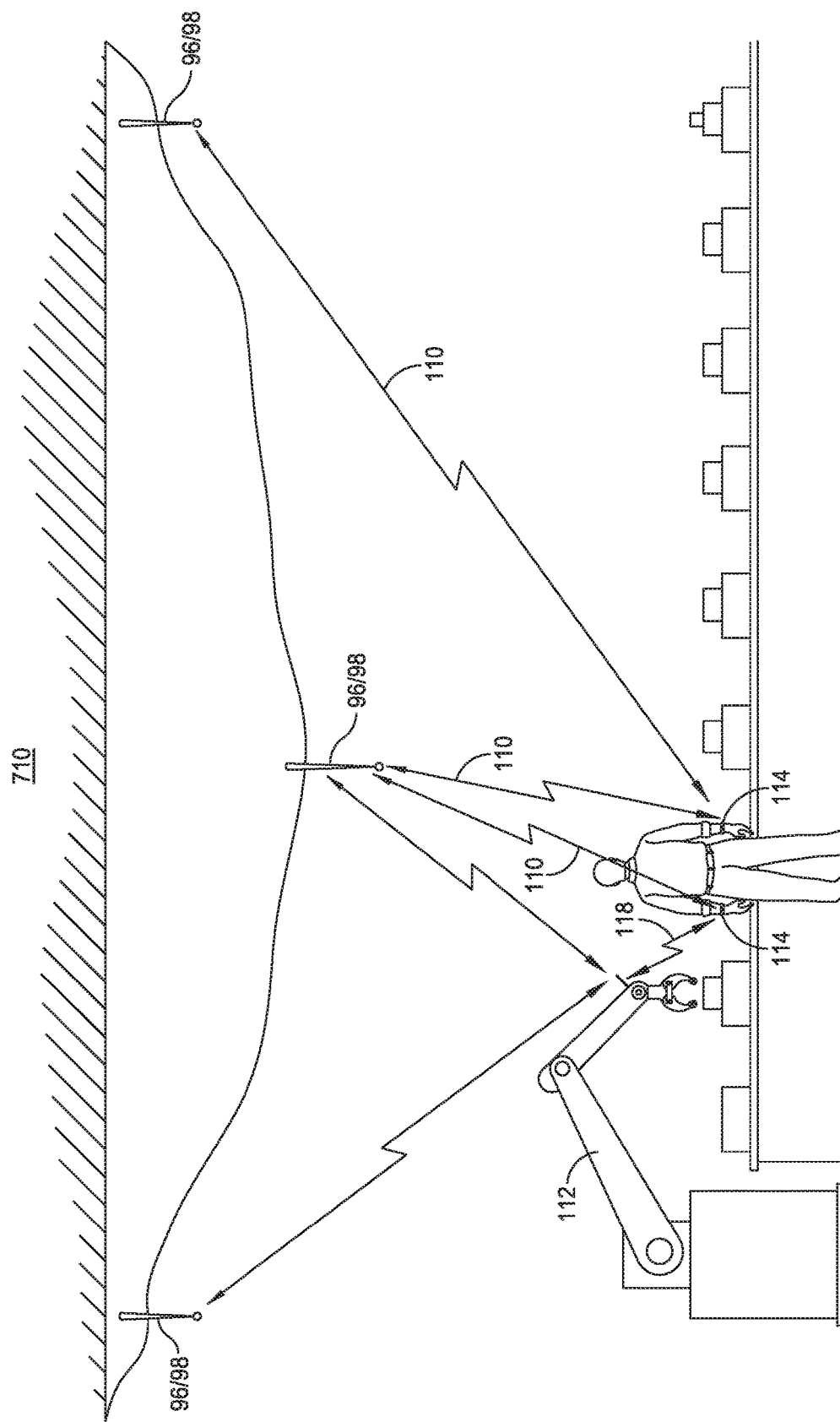
FIG. 13 illustrates one embodiment of a system for measuring distance with precision with TOF signals for detecting a user's body movement in cooperation with an industrial automation environment.

Referring to FIG. 13, In accordance with various aspects and/or embodiments of the subject disclosure, there is illustrated an example of a system 700 and method for detecting a user's body movement in cooperation with an industrial automation environment. The system and method includes employing plurality of TOF transmitters 96 or transceivers 98 (depicted by an antenna) as has been described herein that transmit and/or receive a signal 110 that detects movement of a transponder 114 mounted to a body part of a user positioned proximate to industrial machinery 112, hereinafter referred to as TOF sensors, according to any of the embodiments systems and with any of the signals that have been disclosed herein, for detecting movement of a body part of the user, ascertaining whether or not the movement of the body part conforms to a recognized movement of the body part, interpreting the recognized movement of the body part as a performable action, and actuating industrial machinery to perform a performable action based on and cooperation with the recognized movement of the body part.

The system includes a plurality of TOF transmitters 96 or transceivers 98 (depicted by an antenna) as has been described herein that transmit and/or transmit and receive a signal 110 for measuring movement of a transponder 114 mounted to a body part of a user positioned proximate to industrial machinery 112, such as a robotic arm, and proximate to the TOF sensors 96/98. The system further includes at least one transponder 118 mounted to the industrial machinery 112, such as a robotic arm, and proximate to the TOF sensors 96/98. According to aspects of this embodiment, a controller can be configured to receive measurements of movement of the receivers or transponders 114, 118 as measured by the transmitters or transceivers 96/98, to determine any or all of whether or not the movement of the body part conforms with a recognized movement of the body part, to determine a precise position and location of the receivers or transponders 114, 118, to predict movement of the human limb, and to control the robotic arm 112 to perform an action based at least in part on instructions received from the industrial controller and a position of the receivers or transponders 114, 118, to control the robotic arm to perform an action based at least in part on instructions received from the industrial controller and a position of the receivers or transponders 114, 118 so that the human and the robotic arm can work in cooperation and without any risk or danger of harm to the human. The system can also be configured to have a transmitter or transceiver on the robotic arm and a transponder or transceiver on the arm of a human so as to have direct time of flight ranging between them robotic arm and the human arm or limb.

In accordance with yet further aspects or embodiments, the system includes time of flight transmitters and/or transceivers and time of flight receivers or transponders (time of flight sensors) in any of the combinations and using any of the signals disclosed herein for constantly monitoring the movement performed by the user, for detecting an appropriate movement performed by the user, for demarcating a safety zone around the industrial equipment for appropriate movement performed by the user and for cooperating with the industrial equipment, and for controlling and actuating the industrial equipment to stay clear of the safety zone and/or to cooperate with and interact with movement of the user.

According to aspects of one embodiment, the time of flight sensors as have been disclosed herein can be used in industrial automation environments of large scale or where, due to distance and/or overwhelming ambient noise, voice commands are futile, it is not uncommon for body movements (e.g., hand gestures, arm motion, or the like) to be employed to direct persons in control of industrial equipment to perform tasks, such as directing a fork lift operator to load a pallet of goods onto a storage shelf, or to inform an overhead gantry operator to raise or lower, move to the right or left, backward or forward, an oversized or heavy component portion (e.g., wing spar or engine) for attachment to the fuselage of an aircraft. These human hand, arm, body gestures, and/or finger gesticulations can have universal meaning to human observers, and/or if they are not immediately understood, they typically are sufficiently intuitive that they can easily be learned without a great investment in training, and moreover they can be repeated, by most, with a great deal of uniformity and/or precision. In the same manner that a human observer can understand consistently repeatable body motion or movement to convey secondary meaning, a system 710 can also utilize human body movement, body gestures, and/or finger gesticulations to have conveyed meaningful information in the form of commands, and can therefore perform subsequent actions based at least in part on the interpreted body movement and the underlying command.

In accordance with one embodiment, TOF sensors can monitor or detect motion associated with the torso of the user located proximate the TOF sensor. In accordance with another embodiment, TOF sensors can detect or monitor motion associated with the hands and/or arms of the user situated within the TOF sensors line of sight. In accordance with another embodiment, TOF sensors can detect or monitor movement associated with the hand and/or digits (e.g., fingers) of the user positioned proximate to automatic machinery.

It is understood that TOF sensors in conjunction or cooperation with other components (e.g., a controller and a logic component) can perceive motion of an object in at least three-dimensions. In accordance with embodiments, TOF sensor can perceive lateral body movement (e.g., movement in the x-y plane) taking place within its line of sight, and also discern body movement in the z-axis as well.

Additionally it is appreciated, in cooperation with further components such as controller and/or associated logic component, TOF sensor as disclosed herein can gauge the velocity with which a body movement, gesticulation, or gesture is performed. For example, where the user is configured with one or more TOF sensors is moving their hands with vigor or velocity, the time of flight sensors in conjunction with a controller and/or logic component, can comprehend the velocity and/or vigor with which the user is moving their hands to connote urgency or aggressiveness. Accordingly, in one embodiment, TOF sensors can perceive the vigor and/or velocity of the body movement. For instance, in an industrial automated environment, where a forklift operator is receiving directions from a colleague, the colleague can have initially commenced his/her directions by gently waving his/her arm back and forth (indicating to the operator of the forklift that he/she is clear to move the forklift in reverse). The colleague on perceiving that the forklift operator is reversing too rapidly and/or that there is a possibility of a collision with on-coming traffic can either start waving his/her arm back and forth with great velocity (e.g., informing the forklift operator to hurry up) or hold up their arm with great emphasis (e.g., informing the forklift operator to come to an abrupt halt) in order to avoid the impending collision. According to aspects of embodiments of this disclosure, the systems disclosed herein can be used to interpret such hand commands and transmit instructions for example to a fork lift operator, where the fork lift operator may not be able to see or hear instructions from the human providing the instructions.

It is appreciate also that according to aspects of such embodiment, the TOF sensors in conjunction with a controller and/or logic component, can detect the sluggishness or cautiousness with which the user configured with time of flight sensors is moving their hands. Such time-of-flight measurements of sluggishness, cautiousness, or lack of emphasis can be interpreted by the controller and/or logic component to convey uncertainty, warning, or caution, and once again can providing instructions to instructions for previously perceived body movements or future body movements. Thus, continuing with the foregoing forklift operator example, the colleague can, after having waved his/her arm back and forth with great velocity, vigor, and/or emphasis can now commence moving his/her arm in a much more languid or tentative manner, indicating to the forklift operator that caution should be used to reverse the forklift.

It is appreciated without limitation or loss of generality that TOF sensors, controller (and associated logic component), and industrial machinery 112 can be located in disparate ends of an automated industrial environment. For instance, in accordance with an embodiment, TOF sensors and industrial machinery 112 can be situated in close proximity to one another, while controller and associated logic component can be located in an environmentally controlled (e.g., air-conditioned, dust free, etc.) environment. In accordance with a further embodiment, time of flight sensors, a controller and logic components can be located in an environmentally controlled safe environment (e.g., a safety control room) while industrial machinery can be positioned in a environmentally hazardous environment.

In order to facilitate communication between the various and disparately located component parts of system 710, a network topology or network infrastructure will usually be utilized. Typically the network topology and/or network infrastructure can include any viable communication and/or broadcast technology, for example, wired and/or wireless modalities and/or technologies can be utilized to effectuate the subject application. Moreover, the network topology and/or network infrastructure can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof.

It can be appreciated from the foregoing, the sequences and/or series of body/movements, signals, gestures, or gesticulations utilized by the subject application can be limitless, and as such a complex command structure or set of commands can be developed for use with industrial machinery 112. Moreover, one need only contemplate established human sign language (e.g. American Sign Language) to realize that a great deal of complex information can be conveyed merely through use of sign language. Accordingly, as will have been observed in connection with the foregoing, in particular contexts, certain gestures, movements, motions, etc. in a sequence or set of commands can act as modifiers to previous or prospective gestures, movements, motions, gesticulations, etc.

According to aspects of certain embodiments, a controller and/or logic component can further be configured to distinguish valid body movement (or patterns of body movement) intended to convey meaning from invalid body movement (or patterns of body movement) not intended to communicate information, parse and/or interpret recognized and/or valid body movement (or patterns of body movement), and translate recognized and/or valid body movement (or patterns of body movement) into a command or sequence of commands or instructions necessary to actuate or effectuate industrial machinery to perform tasks. For example, to aid a controller and/or associated logic component in differentiating valid body movement from invalid or unrecognized body movement, a controller and/or logic component can consult a persisted library or dictionary of pre-established or recognized body movements (e.g., individual hand gestures, finger movement sequences, etc.) in order to ascertain or correlate the body movement supplied by, and received from, TOF sensors with recognized body movement, and thereafter to utilize the recognized body movement to interpret whether or not the recognized body movement is capable of one or more performable action in cooperation with industrial machinery 112.

It should be noted without limitation or loss of generality that the library or dictionary of pre-established or recognized body movements as well as translations or correlations of recognized body movement to commands or sequences of command can be persisted to memory or storage media.

Thus, while the persistence devices (e.g., memory, storage media, and the like) are not depicted, typical examples of these devices include computer readable media including, but not limited to, an ASIC (application specific integrated circuit), CD (compact disc), DVD (digital video disk), read only memory (ROM), random access memory (RAM), programmable ROM (PROM), floppy disk, hard disk, EEPROM (electrically erasable programmable read only memory), memory stick, and the like.

In connection with the aforementioned library or dictionary of established or recognized body movements, it should be appreciated that the established or recognized body movements are generally correlative to sets of industrial automation commands universally comprehended or understood by diverse and/or disparate industrial automation equipment in the industrial automation environment. The sets of commands therefore are typically unique to industrial automation environments and generally can include body movement to command correlations for commands to stop, start, slow down, speed up, etc. Additionally, the correlation of body movements to industrial automation commands can include utilization of established sign language (e.g., American Sign Language) wherein sign language gestures or finger movements can be employed to input alphanumeric symbols. Thus, in accordance with an aspect, letters (or characters) and/or numerals can be input by way of time of flight sensors to correlate to applicable industrial automation commands.

Cell Phone-to-Cell Phone and/or Object Ranging

Figure 14:
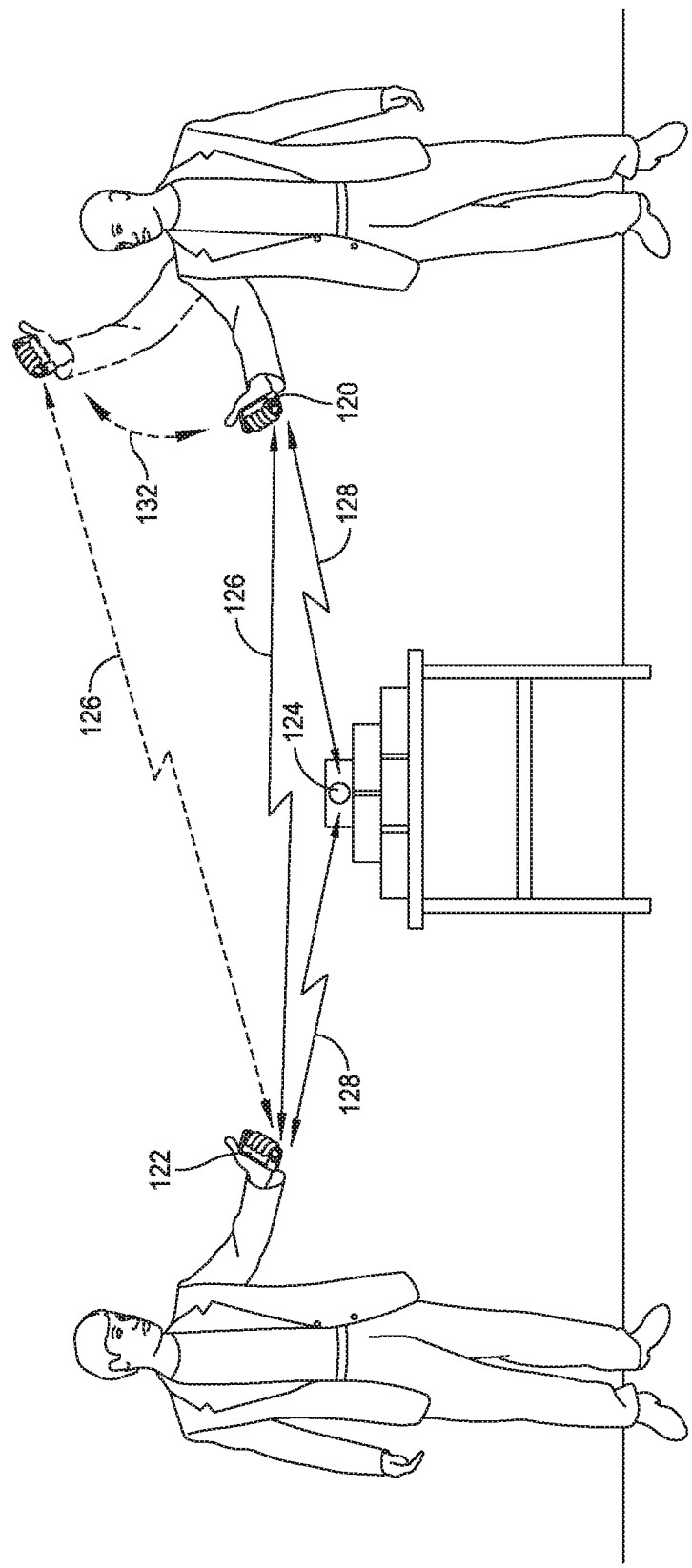
FIG. 14 illustrates one embodiment of a system for measuring distance with precision with TOF signals for measuring cell phone-to-cell phone or cell phone-to-object metrics.

Referring to FIG. 14, In accordance with various aspects and/or embodiments of the subject disclosure, there is illustrated an example of a system 720 and method for detecting a user's body movement and for ranging to another user, for example holding a mobile device, or to an object. This embodiment of a system and method includes employing any of a TOF transmitter 96 or transceiver 98 (depicted as part of a mobile device) in a mobile device 120 as has been described herein that transmits a signal 126 to a receiver in a second mobile device 122 and/or receives a re-transmitted signal 126 from a transponder in the second mobile device 122. Mobile device 122 may also transmit a signal 128 to a receiver in another object 124 and/or receive a re-transmitted signal 128 from a transponder in the object 124.

According to this embodiment, a user can waive his mobile device 120 containing a time of flight transmitter 96 or transceiver 98 along a line 132 to create a plurality of positions of the mobile device 120, thus in effect creating a plurality of transmitters or transceivers at various positions. According to this embodiment, the plurality of transmitters or transceivers created by waving the mobile device 120 along line 132 forms a set of pseudo-array elements providing multiple TOF ranging measurements at the various positions along line 132. The relationship between the various positions may be determined by the mobile device 120 by, e.g., accelerometer data, GPS data, or a pre-established movement sequence, for example. By analyzing the TOF ranging measurements from the various positions to another transponder, e.g., in object 124 or second mobile device 122, the mobile device 120 can determine by, e.g., triangulation, the position of the object 124 or the second mobile device 122 relative to mobile device 120. Further, having determined a relative position of an object 124, second mobile device 122, or other devices, mobile device 120 can use knowledge of their relative locations for future determinations of its own location; such would be a synthetic baseline of reference positions, e.g., the relative locations of the object 124, second mobile device 122, and other devices determined during a pseudo-array measurement of TOF ranges.

Also according to this embodiment, a mobile device 120 may be outfitted with a GPS receiver and an inertial sensor, such as a micro electromechanical system (MEMS) sensor, e.g., an accelerometer, and may use position information from these other sources in combination with the pseudo-array TOF rangefinding information to precisely locate the object 124 or second mobile device 122 in latitude, longitude, and elevation, or relative to some other coordinate system. A further advantage for some applications of this embodiment includes the mobile device 120 providing a higher rate or frequency of position fixes by combining TOF-based location determinations at intervals with accelerometer-based increments between the TOF-based location determinations. This approach could be used to increase the rate of position fixes by a multiplying factor without increasing power requirements or transmit intervals of the TOF transmitters or transceivers. For example, positioning intervals could be increased by a factor of ten or more with this approach. Alternately, the TOF transmit intervals could be reduced (to save power) while maintaining a certain rate of position determinations.

According to this embodiment, the plurality of transmitters or transceivers created by waving the mobile device 120 along line 132 can send a signal 126 to a receiver in a second mobile device 122 and/or receives a re-transmitted signal 126 from a transponder in the second mobile device to perform precise ranging between first mobile device 120 and the second mobile device. According to aspects of this embodiment, an object 124 can be provide with a receiver that receives a transmitted signal 128 from the mobile device 120 and/or a transponder that receives and transmits a re-transmitted signal 128 from the transponder back to the first mobile device and/or to a receiver and/or a transponder in the second mobile device 122. According to this embodiment, the plurality of transmitters or transceivers created by moving the mobile device 120 along the line 132 can send a signal 126 to object to perform precise ranging between first mobile device 120 and the object and/or to the second mobile device. It is appreciated that according to aspects of this embodiment is that the object can be any object and the purpose of ranging to the object can be for many purposes, some of which are discussed herein in relation to other embodiments disclosed herein. Thus the system according to this embodiment includes a plurality of TOF transmitters 96 or transceivers 98 disposed in a mobile device 120 as has been described herein that transmit and/or receive a signal that detects a distance and/or a position between the mobile device 120 and an object 124, such as for example another mobile device 122.

UAV Package Delivery

Figure 15:
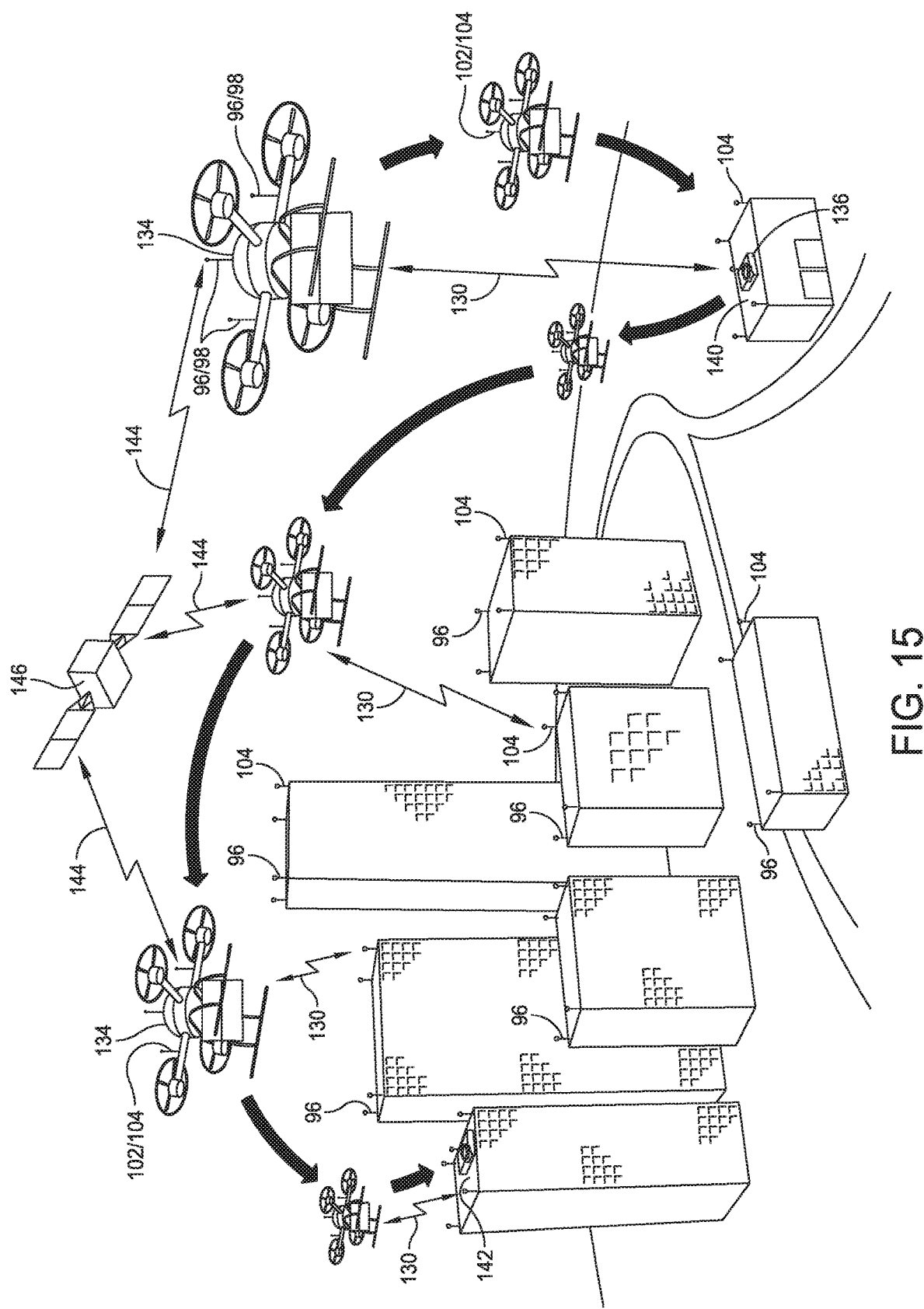
FIG. 15 illustrates one embodiment of a system for measuring distance with precision with TOF signals for guiding an unmanned aerial vehicle for delivering a package or object.

Reference is now made to FIG. 15 in accordance with various aspects and/or embodiments of the subject disclosure, there is illustrated an example of a system 730 and method for guiding an unmanned aerial vehicle ("UAV") configured to autonomously deliver or to pick up items of inventory to and from various delivery locations. As discussed in further detail below, in some implementations, the UAV may receive delivery parameters (e.g., item information, source location information, and/or delivery location information), autonomously or semi-autonomously retrieve the item(s) from a source location (e.g., a materials handling facility or a third party seller), compute a route from the source location to a delivery location, and aerially transport the retrieved item(s) to the delivery location.

This embodiment of a system and method includes employing a plurality of TOF transmitters 96 or transceivers 98 as has been described herein that transmit a signal 130 to a receiver 102 and/or receives a re-transmitted signal 130 from a transponder 104. It is appreciated that the transmitters 96 can be located on fixed structures such as the tops of buildings, etc. and that receiver 102 or transponders 104 (depicted as antennas on the UAV) can be located on the UAV. Alternatively, transceivers 98 can be located on a UAV (depicted as antennas on the UAV) and transponders 104 can be located for example on top of building or any other structure. A UAV can be configured to fly, for example, above the rooftops of city buildings on the way to pick up a package 136 at a landing site 140 and/or deliver the package to a "landing site" 142, such as for example on the roof of a distant building. The UAV can be configured to receive GPS navigation signals 144 from a satellite 146 orbiting the earth above the city. The UAV can also be configured to receive navigation signals 130 from antennae located on the rooftops of the buildings so as to navigate the UAV in addition to the GPS signals or as a replacement for receiving any GPS signals. In particular, the signals from the many rooftop antennae 96 and/or 104 create an invisible "highway in the sky" path that the UAV's follow when moving above the city and between buildings. An analogy would be, for example, in the U.S., commercial and civilian aircraft navigate using GPS, plus a backup system of VHF Omni-directional Range (VOR) distributed across the landscape. If/when GPS fails, aircraft can "follow" the flight paths established by these beacons. Package delivery UAVs, similarly could use GPS signals to navigate and an additional navigation system, similar to VOR beacons to navigate UAVs to package pickup and/or delivery sites. Such high-precision TOF transmitters 96 or transponders 104 can be placed on building rooftops, other parts of a building, or elsewhere to create safe pathways for UAVs to follow.

Figure 16:
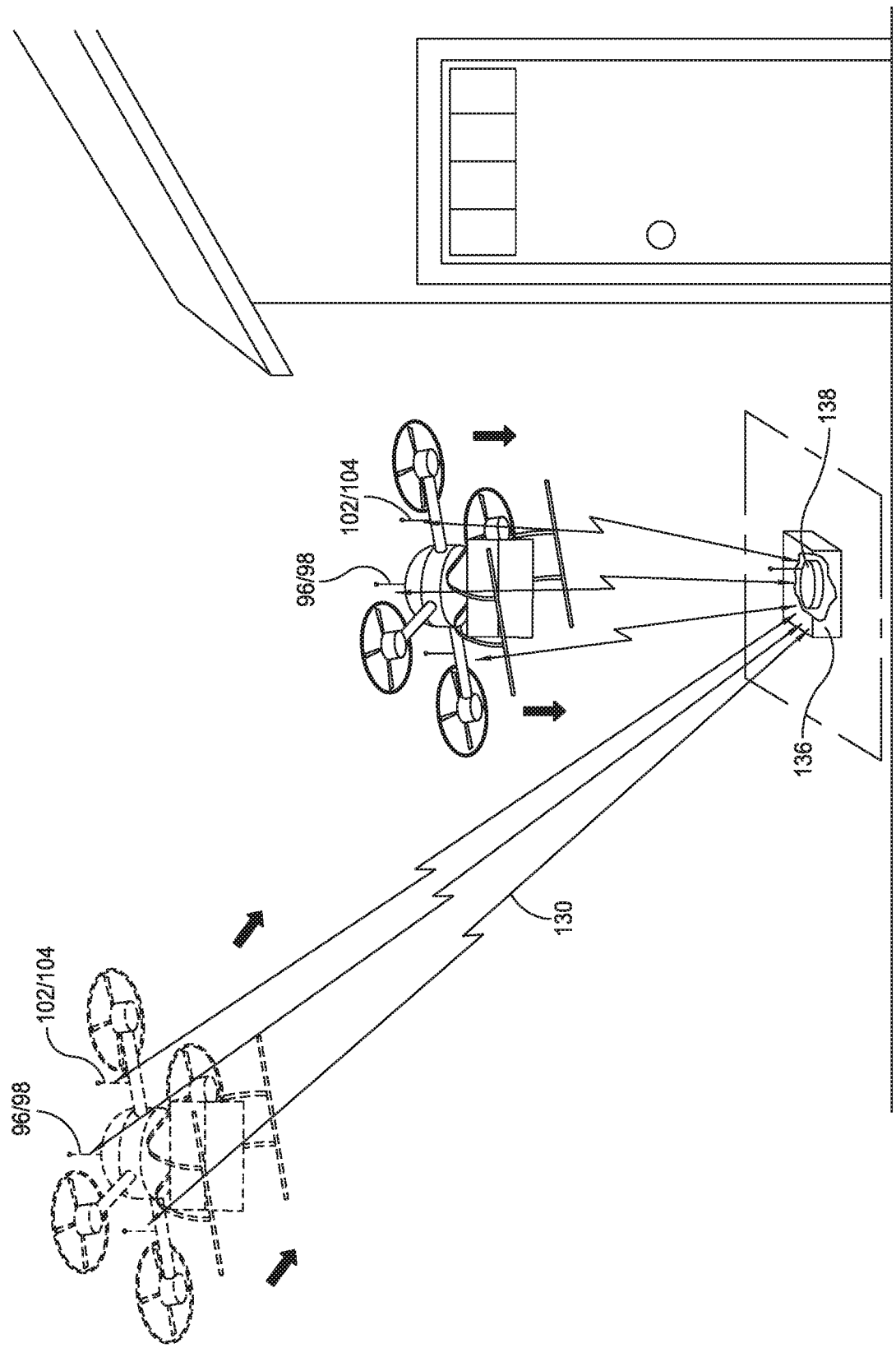
FIG. 16 illustrates one embodiment of a system for measuring distance with precision with TOF signals for guiding an unmanned aerial vehicle with a beacon.

According to aspects of this embodiment and referring to FIG. 16, the UAV can make a stop along the way to the delivery address 142 to pick up a package. It can be navigated by GPS signals 144 and/or time of flight signals 130. In addition, in order for the UAV to be able to precisely pick up the package 136 for delivery, the package itself may a beacon 138 that can for example be a transponder 104 that responds to and re-transmits signal 130 so as to precisely navigate the UAV to pick up the package 136.

It is appreciated according to aspects of this disclosure that the package delivery UAVs presently have limited battery life and it's possible that these drones will need to make stops along their delivery routes to exchange batteries or recharge their batteries. In addition, it is anticipated that UAVs flying in, e.g., urban areas, may need to make emergency landings in safe "ditch" zones, where the drone can be serviced and/or retrieved. Thus according to aspects and embodiments, it is envisioned that transmitter 96 or transceiver 98 or transponders 104 can also be placed on/at select UAV recharge/gas/service stations for guiding UAV's, where UAV's can land to any of swap out batteries, recharge its battery, "ditch" in the event of system failure, etc. After any of these, the UAV will continue on its way to the package pickup 140 or package delivery site 142, where it can pickup and/or drop off of the package 136.

Thus, according to embodiments of this, an UAV is configured to autonomously deliver items of inventory to various delivery locations. According to embodiments of this disclosure, an UAV may receive delivery parameters (e.g., item information, source location information, and/or delivery location information), autonomously or semi-autonomously retrieve the item(s) from a source location (e.g., a materials handling facility or a third party seller), compute a route from the source location to a delivery location, and aerially transport the retrieved item(s) to the delivery location. According to some implementations, the UAV will communicate with other UAVs in the area to obtain information. This information may be stored in a central location and/or dynamically shared between nearby UAVs, materials handling facilities, relay locations, a UAV management system and/or secure delivery locations. For example, other UAVs may provide information regarding weather (e.g., wind, snow, and rain), landing conditions, traffic, etc. The UAV may utilize this information to plan the route from the source location to the delivery location and/or to modify the actual navigation of the route. In addition, in some implementations, the UAV may consider other environmental factors while navigating a route.

According to some implementation, when the UAV reaches the delivery location, it will identify an area at the delivery location where it can safely approach the ground, or another surface, and leave the inventory item, thereby completing the delivery. This may be done through assistance of the time of flight beacons, and/or with the aid of the beacon 138 on the ground that helps to navigate the UAV to a location to either pickup or drop off a package. In other implementations, if the UAV has previously landed at the delivery location, it may use stored information about the delivery location (e.g., safe landing area, geographic coordinates of the landing area) to navigate the landing at the delivery location. Upon completion of the delivery, the UAV may return to a materials handling facility or another location to receive different inventory, recharge, etc.

As used herein, a materials handling facility may include, but is not limited to, warehouses, distribution centers, crossdocking facilities, order fulfillment facilities, packaging facilities, shipping facilities, rental facilities, libraries, retail stores, wholesale stores, museums, or other facilities or combinations of facilities for performing one or more functions of materials (inventory) handling. A delivery location, as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using a UAV. A service location as used herein may include, but is not limited to, a delivery location, a materials handling facility, a cellular tower, a rooftop of a building, a secure delivery location, or any other location where a UAV can any of land, charge, retrieve inventory, replace batteries, and/or receive service.

Autonomous or Semi-Autonomous Vehicle Navigation

Figure 17:
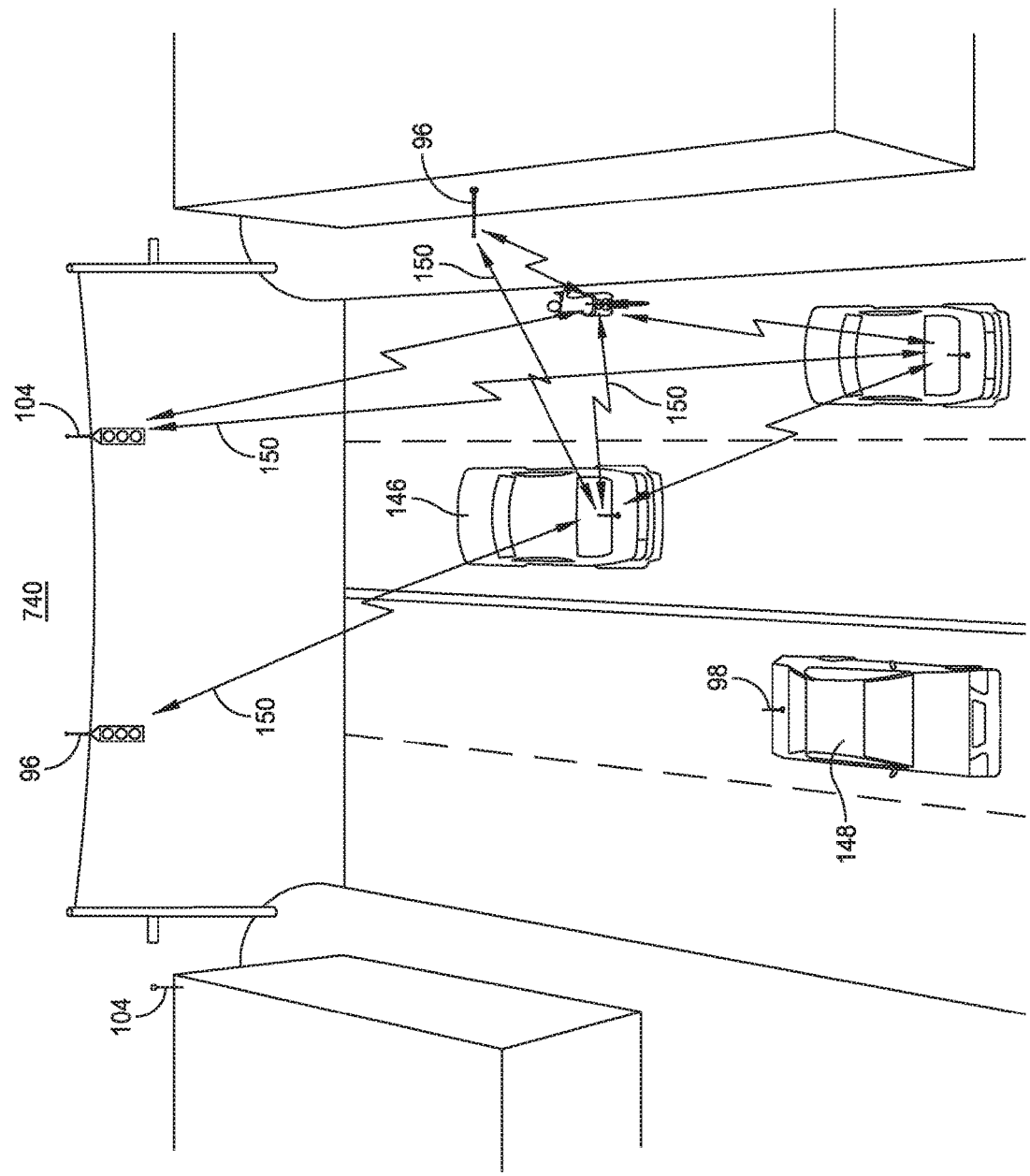
FIG. 17 illustrates one embodiment of a system for measuring distance with precision with TOF signals for guiding a vehicle along a roadway, with respect to other vehicles and objects and for maneuvering an intersection.

Reference is now made to FIG. 17 in accordance with various aspects and/or embodiments of the subject disclosure, there is illustrated an example of a system 740 and method for guiding a vehicle either autonomously or semi-autonomously to various locations. As discussed in further detail below, in some implementations, the vehicle may receive destination parameters (e.g., location information), autonomously or semi-autonomously compute a route from the current destination to another destination, and autonomously or semi-autonomously be navigated to such location.

This embodiment of a system and method includes employing a plurality of TOF transmitters 96 or transceivers 98 as has been described herein that transmit a signal 130 to a receiver 102 and/or receives a re-transmitted signal 130 from a transponder 104. It is appreciated that the transmitters 96 can be located on fixed structures such as the tops of buildings, etc and that receiver 102 or transponders 104 (depicted as antennas on the UAV) can be located on the vehicles 146, 148. Alternatively, transceivers 98 can be located on a vehicle (depicted as antennas on vehicles) and transponders 104 can be located for example on top of building or any other structure such a traffic light or post. A vehicle can be configured to move along roadways, to navigate intersections, etc. It is appreciate that such a TOF system can be part of an overall navigation and collision avoidance guidance system. For example, the vehicle can also be configured to receive GPS navigation signals from a satellite orbiting the earth. The vehicles can also be configured with additional transceivers to communicate between the vehicles to for example avoid collisions. It is also appreciated that the vehicles can be outfitted with other existing collision avoidance systems such as radar, optical, and the like, as are known to those of skill in the art. Thus, according to aspects of this embodiment, vehicles 146, 148 can also be configured to receive navigation signals 150 from antennae located on the rooftops of the buildings, traffic lights, light posts, and the like so as to navigate the vehicle, to update the navigation sensors, to calibrate or reset the navigation sensors, which navigation signals can be used in addition to the GPS signals or as a replacement for receiving any GPS signals. In particular, the signals from the many rooftop antennae 96 and/or 104 create signals that the vehicles can range to follow when moving along roadways, encountering intersections, and the like. Such high-precision TOF transmitters 96 or transponders 104 can be placed on building rooftops to create safe pathways for vehicles to use to navigate autonomously or semi-autonomously.

Bridge Inspection

Figure 18:
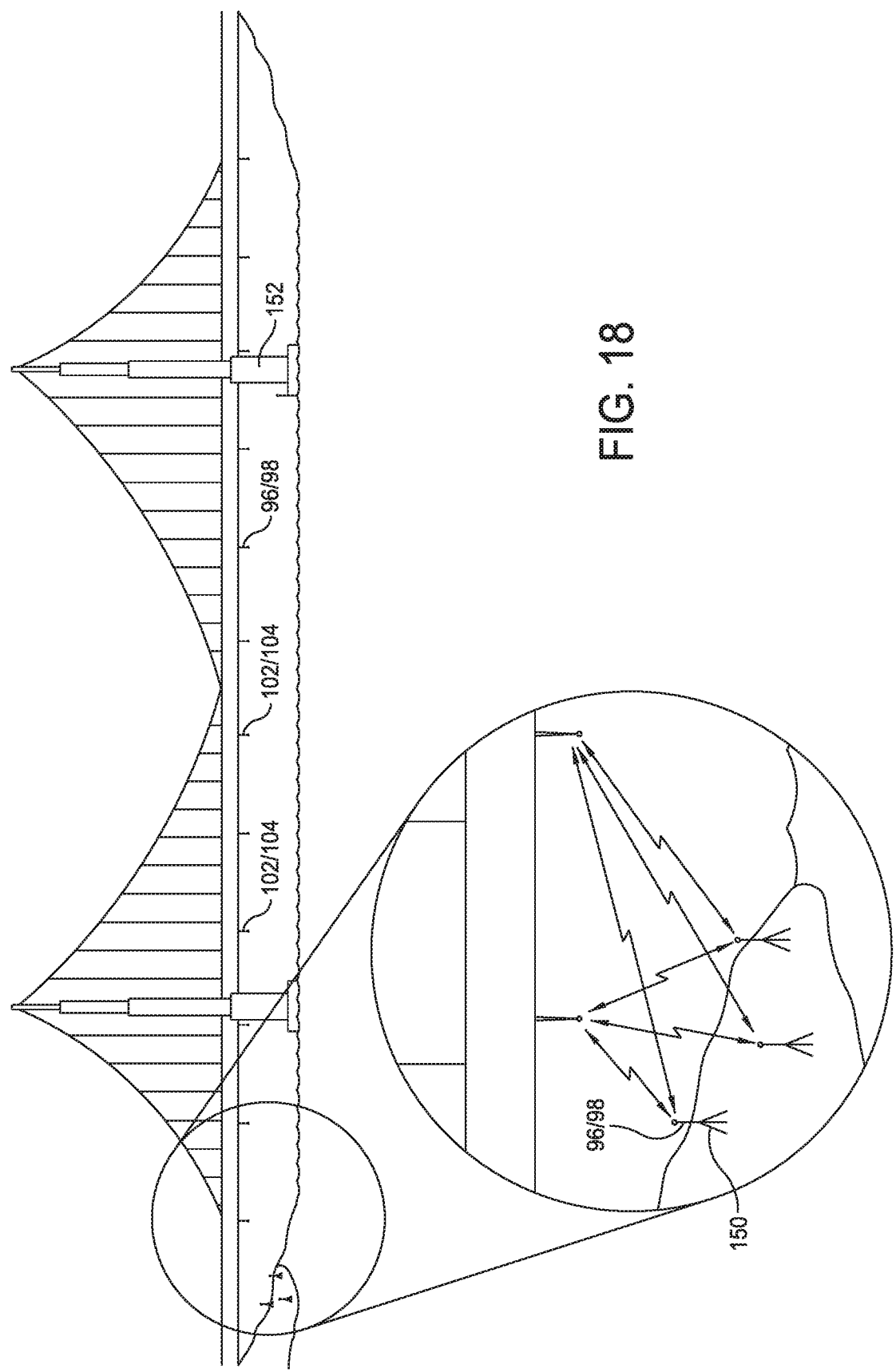
FIG. 18 illustrates one embodiment of a system for measuring distance with precision with TOF signals for monitoring a bridge or other structure.

Reference is now made to FIG. 18 in accordance with various aspects and/or embodiments of the subject disclosure, there is illustrated an example of a time of flight signaling system 750 and method for monitoring a bridge for example for performing in situ monitoring of real time load dynamics of a bridge structure to quantify acceptable structural integrity characteristics which may be compared over time with actual bridge loads to determine structural degradation and thereby alert repair. Another aspect of this disclosure is to provide a bridge monitoring system capable of providing non-contact measurement of structural loading of a bridge. Another aspect of this disclosure is to provide a bridge monitoring system capable of monitoring structural members of a bridge to create velocity and displacement time signals of the bridge's vibratory response to quiescent conditions, which sensed velocity time data can for example be converted to the frequency domain data to provide a "signature" waveform for the bridge indicative of acceptable structural integrity characteristics of the bridge. Another aspect of this disclosure is to provide a bridge monitoring system capable including a site installed time of flight signal based motion monitoring system for obtaining velocity time signal data of an onsite bridge structure and for reporting the sensed data to a remote central analysis center which is responsive to sensed time of flight signal data from a plurality of site installed time of flight sensors, thereby creating a centralized time history for bridges. Thus, aspects of the disclosure provide a comprehensive bridge management system using time of flight signals to obtain data on the condition of a bridge, such as to monitor the impacts and repercussions of bridge deterioration or failure to be dealt with in the most efficient, safe and cost effective manner.

This embodiment of a system and method includes employing a plurality of TOF transmitters 96 or transceivers 98 as has been described herein that transmit a signal 130 to a receiver 102 and/or receives a re-transmitted signal 130 from a transponder 104. It is appreciated that the transmitters 96 or transceivers 98 can be located on fixed structures such as tripods 150 on land, the stanchion of a bridge, or any other fixed location of structure, and that a receiver 102 or transponders 104 (depicted as antennas on the bridge) can be located at a plurality of locations on a bridge. Alternatively, transmitter 96 or transceivers 98 can be located on a bridge (depicted as antennas on vehicles) and receivers 102 or transponders 104 can be located at any fixed location such as a tripod on land, the top of building, etc. A vehicle can be configured to move along roadways, to navigate intersections, etc. It is appreciated that such a TOF system can be part used as part of an overall bridge inspection system. Thus, according to aspects of this embodiment, the various embodiments of the time of flight systems disclosed herein can be used to monitor a bridge for example for performing in situ monitoring of real time load dynamics of a bridge structure to quantify acceptable structural integrity characteristics which may be compared over time with actual bridge loads to determine structural degradation and thereby alert repair.

Other Examples

According to aspects and embodiments of any of the TOF ranging systems disclosed herein, the system can be used to accomplish precise distance measurements.

According to aspects and embodiments of any of the TOF ranging systems disclosed herein, the system can be used to accomplish multiple distance measurements for multilateration.

According to aspects and embodiments of any of the TOF ranging systems disclosed herein, the system can be used to accomplish highly precise absolute TOF measurements.

According to aspects and embodiments of any of the TOF ranging systems disclosed herein, the system can be used to accomplish precision localization of a plurality of transceivers.

According to aspects and embodiments of any of the TOF ranging systems disclosed herein, the system can be used to accomplish ranging with a hyperbolic time difference of arrival methodology.

According to aspects and embodiments of any of the TOF ranging systems disclosed herein, the system can use any pulse compressed signal.

According to aspects and embodiments of any of the TOF ranging systems disclosed herein, each transponder can be configured to detect a signal of a unique code and respond only to that unique code.

According to aspects and embodiments of any of the TOF ranging systems disclosed herein, a plurality of transmitters or transceivers can be networked together and configured to transmit at regular, precisely timed intervals, and a plurality of transponders can be configured to receive the transmissions and localize themselves via a hyperbolic time difference of arrival methodology.

According to aspects and embodiments of any of the TOF ranging systems disclosed herein, at least one transceiver is carried on a vehicle.

According to aspects and embodiments of any of the TOF ranging systems disclosed herein, at least one transceiver is carried on an unmanned aerial vehicle.

According to aspects and embodiments of any of the TOF ranging systems disclosed herein, at least one transceiver may be fixed to a person or animal, or to clothing, or embedded in clothing, a watch, or wristband, or embedded in a cellular or smart phone or other personal electronic device, or a case for a cellular or smart phone or other personal electronic device.

According to aspects and embodiments of any of the TOF ranging systems disclosed herein, transceivers can discover each other and make an alert regarding the presence of other transceivers. Such discovery and/or alerts may be triggered by responses to interrogation signals or may be triggered by enabling transceivers via an auxiliary wireless signal as discussed. For example, vehicles could broadcast a BLE signal that activates any TOF transceiver in its path and thereby discover humans, animals, vehicles, or other objects in its path. Similarly, a human, animal, or vehicle in the path may be alerted to the approaching vehicle. In another scenario, people with transceivers on their person may be alerted to other people's presence, e.g., when joining a group or entering a room or otherwise coming in to proximity. In such a scenario, distance and location information may be provided to one or more of the people.

According to aspects and embodiments of any of the TOF ranging systems disclosed herein, a plurality of transponders are carried on an unmanned vehicle and are configured to make up a wireless network for ranging to the at least one transceiver.

According to aspects and embodiments of any of the TOF ranging systems disclosed herein, the system can comprise a wireless network of wireless transponders in fixed locations, and wherein the element to be tracked includes at least one transceiver that pings the wireless transponders with coded pulses so that the transponders only respond and reply with precisely coded pulses. According to aspects of this embodiment, the system can use any pulse compressed signal. According to aspects and embodiments of any of the TOF ranging systems disclosed herein, the system further comprises a wireless network of wireless transponders in fixed locations that interrogate and reply to each other for purposes of measuring a baseline between the wireless transponders for calibrating the network.

According to aspects and embodiments of any of the TOF ranging systems disclosed herein, an object to be tracked includes at least one transceiver that is configured to transmit the first signal to interrogate one of a plurality of transponders in the network, and wherein the at least one transponder is configured to respond to the first signal and to transmit a signal to interrogate one or more other transponders in the network, and wherein the one or more other transponders emit a second signal that is received by the original interrogator-transceiver for purposes of calibration.

According to aspects and embodiments of any of the TOF ranging systems disclosed herein, an object being tracked can comprise multiple transceivers wired together to form an object network, each transceiver being capable of interrogating and receiving from a network of transponders for purposes of making multiple measurements from the vehicle measuring orientation such as pitch and roll of the vehicle.

According to aspects and embodiments of any of the TOF ranging systems disclosed herein, the system further comprises a wireless network of wireless transceivers in fixed locations that transmit and reply to each other for purposes of measuring a baseline between the wireless transceivers for calibrating the network.

According to aspects and embodiments of any of the TOF ranging systems disclosed herein, the system comprises at least one transponder that is programmed to send a burst of data and its timing transmission and including data for purposes of revealing any of temperature, battery life, other sensor data, and other characteristics of the transponder.

According to aspects and embodiments of any of the TOF ranging systems disclosed herein, the system can include wireless transponders configured to send ranging signals between each of the transponders for measuring distances between transponders.

According to aspects and embodiments of any of the TOF ranging systems disclosed herein, the system can include multiple unmanned vehicles that can be tracked by the system, each unmanned vehicle having a transceiver or transponder configured for sending and receiving signals to range to each other so that the multiple unmanned vehicles move precisely with respect to each other, and each unmanned vehicle further comprises a transmitter and/or receiver for transmitting and/or receiving signals for purposes of capturing data with each unmanned vehicle. According to aspects of this embodiment, the multiple unmanned vehicles are configured to hold position with respect to each other or fly precision control lines so as to make up an array of sensors, and the transmitters and/or receivers are configured to transmit and/or receive signals for mapping a surface or for other data collection. According to aspects of this embodiment, the multiple unmanned vehicles can be configured to hold position with respect to each other so as to fly in an orbit around and object to be imaged, and wherein the transmitters and/or receivers can be configured to transmit and/or receive signals for imaging the object.

According to aspects and embodiments of any of the TOF ranging systems disclosed herein, the system can include multiple unmanned vehicles that are being tracked by the system, each unmanned vehicle having a transceiver or transponder configured for sending and receiving signals to range to each other so that the multiple unmanned vehicles move precisely with respect to each other, and each unmanned vehicle further comprises a transmitter and/or receiver for transmitting and/or receiving signals so that the multiple unmanned vehicles self-position for purposes of creating a precision navigation network in an unprepared environment. According to aspects and embodiments of this embodiment, a first unmanned vehicle can be configured to fly to a fixed location, and another unmanned vehicle includes can be configured with an inertial or acceleration sensor so that it navigates itself by ranging to the fixed location of the first unmanned vehicle by creating a synthetic baseline, by integrating an accelerometer signal and ranging over time in order to localize itself relative to a fixed point.

According to aspects and embodiments of any of the TOF ranging systems disclosed herein, the system can include a plurality of transponders or transceivers that are configured to be placed at various points on a human body and are configured to measure precise ranges between each other, the system can be further configured to collect and record such measurements in a central processor for purposes of identifying any of motion patterns for exercise, physical therapy, locomotion aberrations, and progression of disease-related movement defects or tremors.

Example Purposes

According to aspects and embodiments of any of the TOF ranging systems disclosed herein, the system can be used for measuring precise travel times between two points so as to measure changes in propagation characteristics of the medium.

According to aspects and embodiments of any of the TOF ranging systems disclosed herein, the system can be used as a synthetic aperture for providing position information of any measured quantity in a two or three dimensional space. For example, light intensity in a room may be measured at various positions, for instance by moving around a light sensor equipped with a TOF ranging device, and the system may record the light intensity at the precise TOF locations to enable a two or three dimensional model or image to be re-created. The light intensity information could include multiple channels, such as for red, green, and blue color information. Any measurable quantity of interest may be 2-D or 3-D mapped. Other measured quantities might include sound intensity levels, such as in a performance hall, industrial environment, or within or around a piece of machinery; temperature, such as at various positions within a room, in a home, office, or inside a refrigerator, radiation levels, such as inside a reactor room or control room, outside a shipping container being inspected, or in and around an area of interest (on the ground or in the airways above) such as a disaster area or a military complex.

According to aspects and embodiments of any of the TOF ranging systems disclosed herein, the system can include a plurality of unmanned vehicles that include a laser scanner or other type of sensor, the sensor or the plurality of laser scanners configured to collectively create a physical map of a local area. According to aspects of this embodiment, the unmanned vehicles can comprise a thermal or chemical sensor, the thermal or chemical sensor configured to collectively create a thermal or chemical map of a local area. According to aspects of this embodiment, the sensors or the plurality of laser scanners can be configured to collectively map the heights of crops, and provide day-to-day comparisons to measure crop growth rates. According to aspects of this embodiment, the unmanned vehicles can be configured to fly with respect to each other to make up a measurement array for purposes of mapping and detecting buried objects such as land mines, electromagnetic fields, chemical concentrations/plumes, or the settling of structures.

According to aspects and embodiments of any of the TOF ranging systems disclosed herein, the system can be used for earthquake and volcano lava dome monitoring and to provide an early warning system.

According to aspects and embodiments of any of the TOF ranging systems disclosed herein, the system can be used as guide localization technology, for example where a museum could be configured with a plurality of TOF transmitters or transceivers/interrogators to locate various transponders implemented in a device such as, for example, a cell phone. The Museums could be outfitted with beacons that tell you which exhibits are near and guide you to the various exhibits. A visitor to the museum could, for example, download an app for the museum on their smart phone, and the system could serve as the measurement source and overall guide to the visitor. The system could also be configured to push information about the exhibit to be shown on the user's phone.

According to aspects and embodiments of any of the TOF ranging systems disclosed herein, the system can be used to navigate an unmanned vehicle so that an operator can remain in safe, well-defined areas and/or within a line-of-site to unmanned vehicle. According to aspects of this embodiment, the system can be used for creating forward supply depots, moving materials and supplies to troop areas.

According to aspects and embodiments of any of the TOF ranging systems disclosed herein, the system can include at least one transceiver carried on an unmanned aerial vehicle for guiding the unmanned vehicle, the unmanned vehicle further comprising GPS receivers to receive GPS signals to navigate the unmanned vehicles, the at least one transceiver configured to navigate the unmanned vehicle for package delivery in addition to or in cooperation with the GPS receivers, the at least one transceiver configured to transmit and/or receive signals from time of flight transmitters or transponders placed on land structures to create a navigation network of beacons for guiding the unmanned vehicle. According to aspects of this embodiment, the system can be used for comprise gas/service stations configured to navigate unmanned vehicles for landing and so that the unmanned can be services, for example to swap out batteries, recharge batters, or land for repairs in the event of failure. According to aspects of this embodiment, a package for pickup and/or delivery is configured with a TOF beacon for guiding the unmanned vehicle to pickup and/or deliver the package.

According to aspects and embodiments of any of the TOF ranging systems disclosed herein, the system can include at least one transceiver carried on an unmanned aerial vehicle for guiding the unmanned vehicle and a transceiver/transponder configured to transmit and receive signals with the transceiver on the unmanned vehicle so as to keep a camera disposed on the unmanned vehicle in a fixed position with respect to transceiver/transponder, the transceiver/transponder configured to worn by or attached to any of an object, person, animal, living being for taking videos and/or pictures of the person, animal, living being. According to aspects of this embodiment, the transceiver/transponder can be attached to a cameraman and the camera is configured to take pictures of news events. According to aspects of this embodiment, the transceiver/transponder can be attached to a paramedic and the unmanned vehicle is configured for delivering supplies and/or equipment including a portable defibrillator, or medications or supplies to the paramedic at the site of the patient. According to aspects of this embodiment, the transceiver/transponder can be placed on wild animals such as endangered African elephants so that the unmanned vehicle follows and monitors the wild animals. According to aspects of this embodiment, the transceiver/transponder can be placed on the roof of a police car during a traffic stop so that the unmanned vehicle is tethered to the police car, and wherein the tether of the unmanned vehicle is configured to play out so that the drone gains altitude as police officer walks further from squad car. According to aspects of this embodiment, the transceiver/transponder can be provided to family members or caregivers of people suffering from communicable disease is rural area so that the unmanned vehicles delivers supplies/medication to home-confined patients and their caregivers, avoiding land-based transport of supplies and potential disease exposure to healthcare workers.

According to aspects and embodiments of any of the TOF ranging systems disclosed herein, the system can be used for tracking a person's hands and a robotic arm for purposes of human-robot collaboration, training or other performance monitoring.

According to aspects and embodiments of any of the TOF ranging systems disclosed herein, the system can be used for measuring physiological parameters, such as heart and respiration rates, for example.

According to aspects and embodiments of any of the TOF ranging systems disclosed herein, the system can be used for precisely locating medical or surgical instruments inside the body.

According to aspects and embodiments of any of the TOF ranging systems disclosed herein, the system can be used for deploying an airbag.

According to aspects and embodiments of any of the TOF ranging systems disclosed herein, the system can be used for measuring collision detection between helmets and for triggering airbag deployment or (or other technology) other collision protection systems.

According to aspects and embodiments of any of the TOF ranging systems disclosed herein, the system can be used for monitoring the motion of body parts in relation to one another for health and fitness purposes.

According to aspects and embodiments of any of the TOF ranging systems disclosed herein, the system can be used for measuring kinesthetic feedback for robotic-assisted mechanical exoskeleton arms and legs.

According to aspects and embodiments of any of the TOF ranging systems disclosed herein, the system can be used for measuring changes in gait, tremors, restless leg motion, early warning for Parkinson's or other motion degradation diseases.

According to aspects and embodiments of any of the TOF ranging systems disclosed herein, the system can be used for monitoring a building for purpose of any of inspection, quality control, and health monitoring.

According to aspects and embodiments of any of the TOF ranging systems disclosed herein, the system can include a plurality of transponders placed in fixed points around a building/structure, and the system can be configured to measure shifting/settling of the structure. According to aspects of this embodiment, the plurality of transponders is placed in fixed points on a fence enabling an unmanned vehicle to fly around the perimeter for fence inspections.

According to aspects and embodiments of any of the TOF ranging systems disclosed herein, the system can be configured for verification of construction specifications.

According to aspects and embodiments of any of the TOF ranging systems disclosed herein, the system can be used for precisely tracking human limbs and robotic arms to enable robots to avoid collisions and better collaborate with human co-workers. According to aspects of this embodiment, the system can be configured to enable mobile robots to become position-aware of human collaborators with transponders for safety. According to aspects and embodiments of this embodiment, the system can be configured for tracking an end effector on a robot arm.

According to aspects and embodiments of any of the TOF ranging systems disclosed herein, the system can be configured for tracking hands of human pilots in a cockpit for training and monitoring.

According to aspects and embodiments of any of the TOF ranging systems disclosed herein, the system can be configured for tracking an end effector on a robot arm.

According to aspects and embodiments of any of the TOF ranging systems disclosed herein, the system can be used for configured for precision ranging between two phones for purposes of coordinating activities.

According to aspects and embodiments of any of the TOF ranging systems disclosed herein, the system can be configured for precision ranging between a phone and an object such as a parked car.

According to aspects and embodiments of any of the TOF ranging systems disclosed herein, the system can be configured measuring precise locomotion of people at sporting, convention and other events.

According to aspects and embodiments of any of the TOF ranging systems disclosed herein, the system can include at least one transmitter configured as a transceiver placed at an intersection, e.g., on a traffic light, and a transponder placed in or on an automobile for purposes of vehicle navigation and/or collision avoidance, so that when an automobile approaches an intersection, a precision range to the traffic light transponder is obtained for purposes of calibrating and resetting automobile navigation solution to a high level of precision.

According to aspects and embodiments of any of the TOF ranging systems disclosed herein, the system can be used for configured as a part of a vehicle-to-vehicle communications system, where each vehicle interrogates its surroundings and receives replies from nearby comparably equipped vehicles providing precision ranging and other data.

According to aspects and embodiments of any of the TOF ranging systems disclosed herein, the system can include a network of transceivers distributed in a garage or parking facility to enable an automobile with autonomous control system to approach and align/park precisely.

According to aspects and embodiments of any of the TOF ranging systems disclosed herein, the system can be configured for measurement of travel time between two points for purposes of measuring changes in radio-propagation for monitoring changes in the medium between the points.

According to aspects and embodiments of any of the TOF ranging systems disclosed herein, the system can include two or more transponders housed on two or more orbiting vehicles for purposes of approaching, docking, and refueling, at least one of the orbiting vehicles.

According to aspects and embodiments of any of the TOF ranging systems disclosed herein, the system can include two or more UAVs configured for precision movement with respect to each other and for using precision radar as a penetrating signal for circling and measuring a weather event such as a tornado, a hurricane, etc.

According to aspects and embodiments of any of the TOF ranging systems disclosed herein, the system can include two or more UAVs are configured for precision movement with respect to each other and for transmitting and receiving a body penetrating signal for human body tomography based on measurements of the body penetrating signal propagation.

According to aspects and embodiments of any of the TOF ranging systems disclosed herein, the system can include two or more transceivers configured for movement on a circular track and for taking multiple measurements while spinning around for purposes of measuring characteristics of an object at the center of the circular track.

According to aspects and embodiments of any of the TOF ranging systems disclosed herein, the system can include multiple transponders placed on a human body in the presence of a network of transceivers and the individual points on the body can be tracked during motion for the purpose of capturing motion for film creation.

According to aspects and embodiments of any of the TOF ranging systems disclosed herein, a transmitter or receiver can be placed in any of a ball, a pucks, etc. for purposes of any of goal detection, monitoring a position of a ball, training, camera following, and other analytics.

According to aspects and embodiments of any of the TOF ranging systems disclosed herein, the system can be used to provide a wireless tether between a rider of a surfboard and an UAV housing a camera for the purpose of following a surfer on the surf board and taking a video of the surfer with the camera.

According to aspects and embodiments of any of the TOF ranging systems disclosed herein, the system can be used to provide a wireless tether between a rider of a bicycle and an UAV housing a camera for the purpose of following a rider on a bicycle and taking a video of the rider with the camera.

According to aspects and embodiments of any of the TOF ranging systems disclosed herein, the system can be used to provide a wireless tether between a skier or snowboarder and an UAV housing a camera for the purpose of following the skier or snowboarder and taking a video of the skier or snowboarder with the camera.

According to aspects and embodiments of any of the TOF ranging systems disclosed herein, the system can be used to create an invisible fence for pets and for monitoring of pets.

According to aspects and embodiments of any of the TOF ranging systems disclosed herein, the system can be used for tracking a hand, a toy bat, a toy gun within a room environment for purposes of coordinating with a motion sensing gaming device.

According to aspects and embodiments of any of the TOF ranging systems disclosed herein, the system can be used for guiding of an aerial vehicle for refueling of airplanes.

According to aspects and embodiments of any of the TOF ranging systems disclosed herein, the system can be used for refueling of a UAV.

According to aspects and embodiments of any of the TOF ranging systems disclosed herein, the system can include a UAV having a video camera that follows a suspect who has been "shot" with a non-lethal goop/net containing a transponder for tracking and apprehending.

According to aspects and embodiments of any of the TOF ranging systems disclosed herein, the system can be used for collecting data on the motion of objects in space and stored for analytics.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system comprising:
    a first interrogator configured to obtain first and second radio-frequency (RF) electromagnetic signals corresponding to a first input RF electromagnetic signal, the first interrogator comprising:
        a first transmit antenna configured to transmit, to a device, the first RF electromagnetic signal;
        a first receive antenna configured to receive, from the device, a third RF electromagnetic signal; and
        a first detection circuit configured to determine a first time of flight between the first interrogator and the device based upon the second RF electromagnetic signal and the third RF electromagnetic signal;
    a second interrogator configured to obtain fourth and fifth RF electromagnetic signals corresponding to a second input RF electromagnetic signal, the second interrogator comprising:
        a second transmit antenna configured to transmit, to the device, the fourth RF electromagnetic signal;
        a second receive antenna configured to receive, from the device, a sixth RF electromagnetic signal; and
        a second detection circuit configured to determine a second time of flight between the second interrogator and the device based upon the fifth RF electromagnetic signal and the sixth RF electromagnetic signal; and
    at least one processor configured to determine a location of the device based upon the first time of flight and the second time of flight.

2. The system of claim 1, wherein the device comprises a transponder.

3. The system of claim 1, wherein the first RF electromagnetic signal is one of a frequency modulated continuous wave (FMCW) signal, a direct sequence spread spectrum signal (DSSS), a pulse compressed signal, and a frequency hopping spread spectrum (FHSS) signal.

4. The system of claim 1, wherein the first detection circuit includes a mixer configured to generate a beat signal based upon the second RF electromagnetic signal and the third RF electromagnetic signal, wherein the first detection circuit is configured to determine the first time of flight based upon the beat signal.

5. The system of claim 4, wherein the first detection circuit further comprises:
    an analog to digital converter configured to receive the beat signal and provide a sampled beat signal; and
    circuitry coupled to an output of the analog to digital converter configured to receive the sampled beat signal and perform a fast Fourier transform on the sampled beat signal.

6. The system of claim 1, further comprising:
    a third interrogator configured to obtain seventh and eighth RF electromagnetic signals corresponding to a third input RF electromagnetic signal, the third interrogator comprising:
        a third transmit antenna configured to transmit, to the device, the seventh RF electromagnetic signal;
        a third receive antenna configured to receive, from the device, a ninth RF electromagnetic signal; and
        a third detection circuit configured to determine a third time of flight between the third interrogator and the device based upon the eighth RF electromagnetic signal and the ninth RF electromagnetic signal.

7. The system of claim 6, wherein the at least one processor is configured to determine the location of the device based upon the first time of flight, the second time of flight and the third time of flight.

8. The system of claim 1, wherein the first RF electromagnetic signal comprises a plurality of impulses.

9. The system of claim 1, wherein the second transmit antenna is configured to transmit the fourth RF electromagnetic signal with a delay relative to a time when the first transmit antenna transmits the first RF electromagnetic signal.

10. The system of claim 1, wherein the first interrogator further comprises a splitter configured to generate the first and second RF electromagnetic signals based upon the first input RF electromagnetic signal.

11. The system of claim 10, further comprising a oscillator configured to generate the first input RF electromagnetic signal.

12. The system of claim 1, wherein the first interrogator is configured to obtain the first and second RF electromagnetic signals from a common oscillator.

13. The system of claim 1, further comprising the device, the device being configured to:
    transmit the third RF electromagnetic signal to the first interrogator in response to receiving the first RF electromagnetic signal from the first interrogator.

14. The system of claim 13, wherein the device comprises a device receive antenna configured to receive the first RF electromagnetic signal and a device transmit antenna configured to transmit the third RF electromagnetic antenna.

15. The system of claim 13, wherein the device comprises circuitry for generating the third RF electromagnetic signal based upon the first RF electromagnetic signal such that the first and third RF electromagnetic signals have different frequencies.

16. The system of claim 1, wherein the first and third RF electromagnetic signals have different frequencies.

17. A method comprising:
obtaining, with a first interrogator, first and second radio-frequency (RF) electromagnetic signals corresponding to a first input RF electromagnetic signal;
transmitting, to a device, the first RF electromagnetic signal using a transmit antenna of the first interrogator;
receiving, from the device, a third RF electromagnetic signal using a receive antenna of the first interrogator;
determining a first time of flight between the first interrogator and the device based upon the second RF electromagnetic signal and the third RF electromagnetic signal;
obtaining, with a second interrogator, fourth and fifth RF electromagnetic signals corresponding to a second input RF electromagnetic signal;
transmitting, to the device, the fourth RF electromagnetic signal using a transmit antenna of the second interrogator;
receiving, from the device, a sixth RF electromagnetic signal using a receive antenna of the second interrogator;
determining a second time of flight between the second interrogator and the device based upon the fifth RF electromagnetic signal and the sixth RF electromagnetic signal; and
determining a location of the device based upon the first time of flight and the second time of flight.

18. The method of claim 17, wherein determining the location of the device based upon the first time of flight and the second time of flight comprises determining the location of the device with sub-millimeter precision.

19. The method of claim 17, wherein the first RF electromagnetic signal is one of a frequency modulated continuous wave (FMCW) signal, a direct sequence spread spectrum (DSSS) signal, a pulse compressed signal, and a frequency hopping spread spectrum (FHSS) signal.

20. The method of claim 17, wherein determining the first time of flight includes mixing the second RF electromagnetic signal and the second RF electromagnetic signal to provide a beat signal.

21. The method of claim 20, wherein determining the first time of flight further comprises:
converting the beat signal into a digital form to provide a sampled beat signal; and
performing a fast Fourier transform on the sampled beat signal.

22. The method of claim 17, wherein obtaining the first and second RF electromagnetic signals comprises obtaining the first and second RF electromagnetic signals from a splitter configured to receive the first input RF electromagnetic signal.

23. The method of claim 22, further comprising generating the first input RF electromagnetic signal with an oscillator.

24. The method of claim 17, wherein the first RF electromagnetic signal comprises a plurality of impulses.

25. The method of claim 17, wherein obtaining the first and second RF electromagnetic signals comprises obtaining the first and second RF electromagnetic signals from a common oscillator.

26. The method of claim 17, further comprising:
obtaining, with a third interrogator, seventh and eighth RF electromagnetic signals corresponding to a third input RF electromagnetic signal;
transmitting, to the device, the seventh RF electromagnetic signal using a transmit antenna of the third interrogator;
receiving, from the device, a ninth RF electromagnetic signal using a receive antenna of the third interrogator;
determining a third time of flight between the third interrogator and the device based upon the eighth RF electromagnetic signal and the ninth RF electromagnetic signal.

27. The method of claim 26, wherein determining the location of the device comprises determining the location of the device based upon the first time of flight, the second time of flight and the third time of flight.

28. The method of claim 17, further comprising transmitting, to the first interrogator, the third RF electromagnetic signal using a transmit antenna of the device in response to receiving, with a receive antenna of the device, the first RF electromagnetic signal from the first interrogator.

29. The method of claim 28, further comprising:
generating, with the device, the third RF electromagnetic signal based upon the first RF electromagnetic signal such that the first and third RF electromagnetic signals have different frequencies.

30. The method of claim 29, further comprising transmitting the first RF electromagnetic signal with a delay relative to the transmission of the fourth RF electromagnetic signal.

31. A system comprising:
a first interrogator configured to obtain first and second radio-frequency (RF) electromagnetic signals corresponding to an input RF electromagnetic signal, the first interrogator comprising:
a transmit antenna configured to transmit, to a device, the first RF electromagnetic signal;
a first receive antenna configured to receive, from the device, a third RF electromagnetic signal; and
a first detection circuit configured to determine a first time of flight between the first interrogator and the device based upon the second RF electromagnetic signal and the third RF electromagnetic signal;
a second interrogator comprising:
a second receive antenna configured to receive, from the device, a fourth RF electromagnetic signal; and
a second detection circuit configured to determine a second time of flight between the second interrogator and the device based upon the fourth RF electromagnetic signal; and
at least one processor configured to determine a location of the device based upon the first time of flight and the second time of flight.

32. The system of claim 31, wherein the device comprises a transponder.

33. The system of claim 31, wherein the first RF electromagnetic signal is one of a frequency modulated continuous wave (FMCW) signal, a direct sequence spread spectrum signal (DSSS), a pulse compressed signal, and a frequency hopping spread spectrum (FHSS) signal.

34. The system of claim 31, wherein the first detection circuit includes a mixer configured to generate a beat signal based upon the second RF electromagnetic signal and the third RF electromagnetic signal, wherein the first detection circuit is configured to determine the first time of flight based upon the beat signal.

35. The system of claim 34, wherein the first detection circuit further comprises:

an analog to digital converter configured to receive the beat signal and provide a sampled beat signal; and circuitry coupled to an output of the analog to digital converter configured to receive the sampled beat signal and perform a fast Fourier transform on the sampled beat signal.

36. The system of claim 31, wherein the device is attached to an object to be tracked.

37. The system of claim 31, wherein the first RF electromagnetic signal comprises a plurality of impulses.

38. The system of claim 31, wherein the first interrogator further comprising a splitter configured to generate the first and second RF electromagnetic signals based upon the first input RF electromagnetic signal.

39. The system of claim 38, further comprising an oscillator configured to generate the first input RF electromagnetic signal.

40. The system of claim 31, wherein the first interrogator is configured to obtain the first and second RF electromagnetic signals from a common oscillator.

41. The system of claim 31, wherein the device comprises circuitry for generating the third RF electromagnetic signal based upon the first RF electromagnetic signal such that the first and third RF electromagnetic signals have different frequencies.

* * * * *